(12) United States Patent
Nishizawa

(10) Patent No.: US 6,280,892 B1
(45) Date of Patent: Aug. 28, 2001

(54) PREEXPOSURE METHOD AND DEVICE FOR PHOTOSENSITIVE FILM

(75) Inventor: Shinji Nishizawa, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/673,424

(22) PCT Filed: Feb. 17, 2000

(86) PCT No.: PCT/JP00/00898

§ 371 Date: Oct. 18, 2000

§ 102(e) Date: Oct. 18, 2000

(87) PCT Pub. No.: WO00/49460

PCT Pub. Date: Aug. 24, 2000

(30) Foreign Application Priority Data

Feb. 18, 1999 (JP) .................................................. 11-040222

(51) Int. Cl.[7] ............................. G03C 5/26; G03C 11/02; G03D 13/08
(52) U.S. Cl. ............................. 430/22; 430/394; 396/315; 396/317; 396/338
(58) Field of Search ..................... 430/22, 394; 396/315, 396/317, 338

(56) References Cited

U.S. PATENT DOCUMENTS 5,307,108 * 4/1994 Yamanwchi et al. ................ 396/315

FOREIGN PATENT DOCUMENTS

| 6-175303 | 6/1994 | (JP) . |
| 8-286285 | 11/1996 | (JP) . |
| 9-230448 | 9/1997 | (JP) . |
| 12-35637 | 2/2000 | (JP) . |

* cited by examiner

*Primary Examiner*—Richard L. Schilling
(74) *Attorney, Agent, or Firm*—Young & Thompson

(57) ABSTRACT

A preexposure apparatus comprises a film supply station ST1 for arranging a film cartridge 14 containing a film 12 accommodated therein, a film-drawing station ST3 for automatically drawing the film 12 over its entire length, an exposure station ST5 for exposing a predetermined portion of the drawn film 12 with an image by the aid of an exposure section 32, a winding station ST6 for automatically rewinding the film 12 after the exposure into the film cartridge 14, and a withdrawing station ST8 for withdrawing the film cartridge 14. Accordingly, the predetermined portion of the film can be preexposed with a desired image automatically and efficiently.

19 Claims, 35 Drawing Sheets

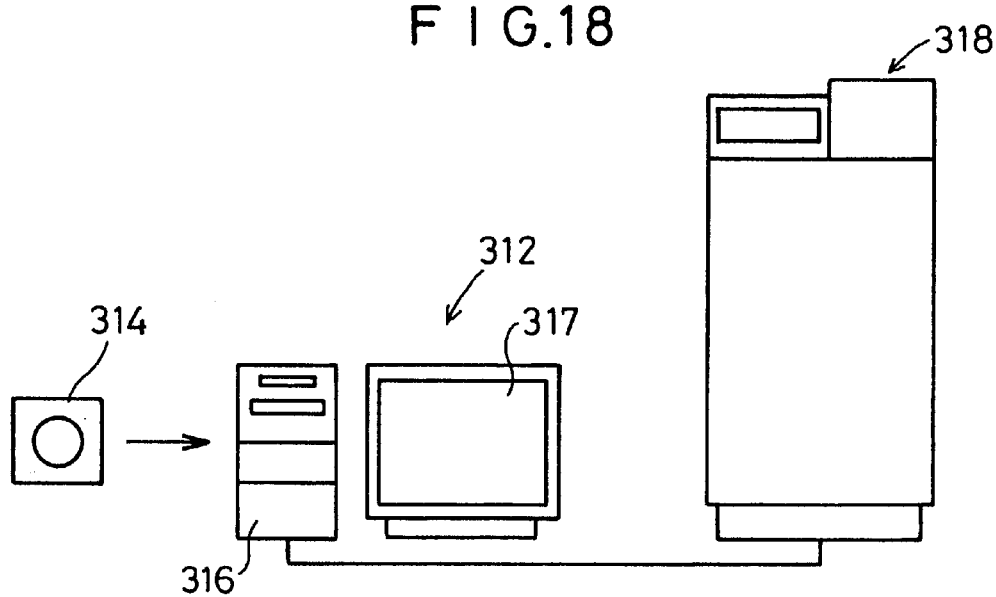
F I G.18

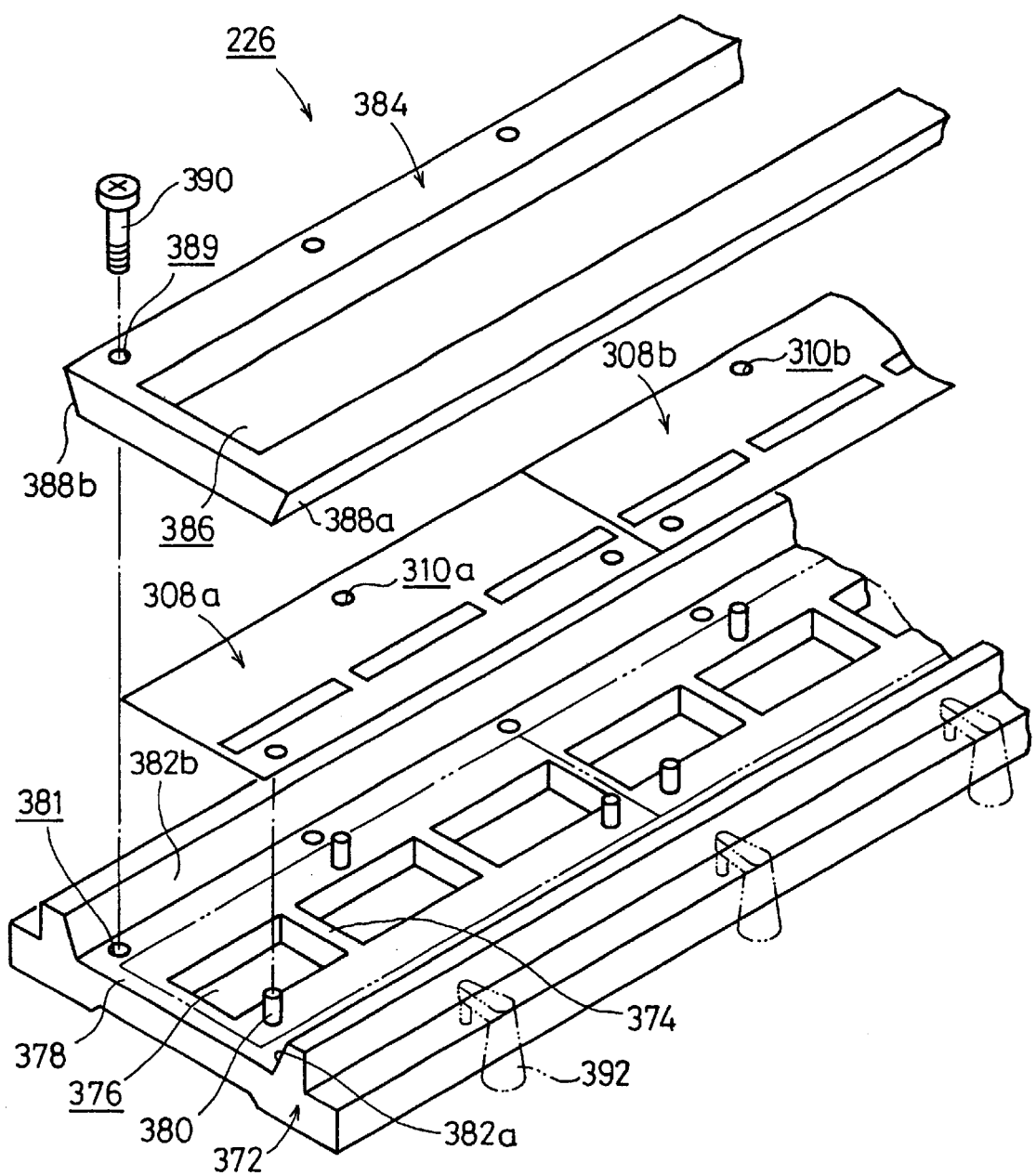
F I G. 22

F I G. 36
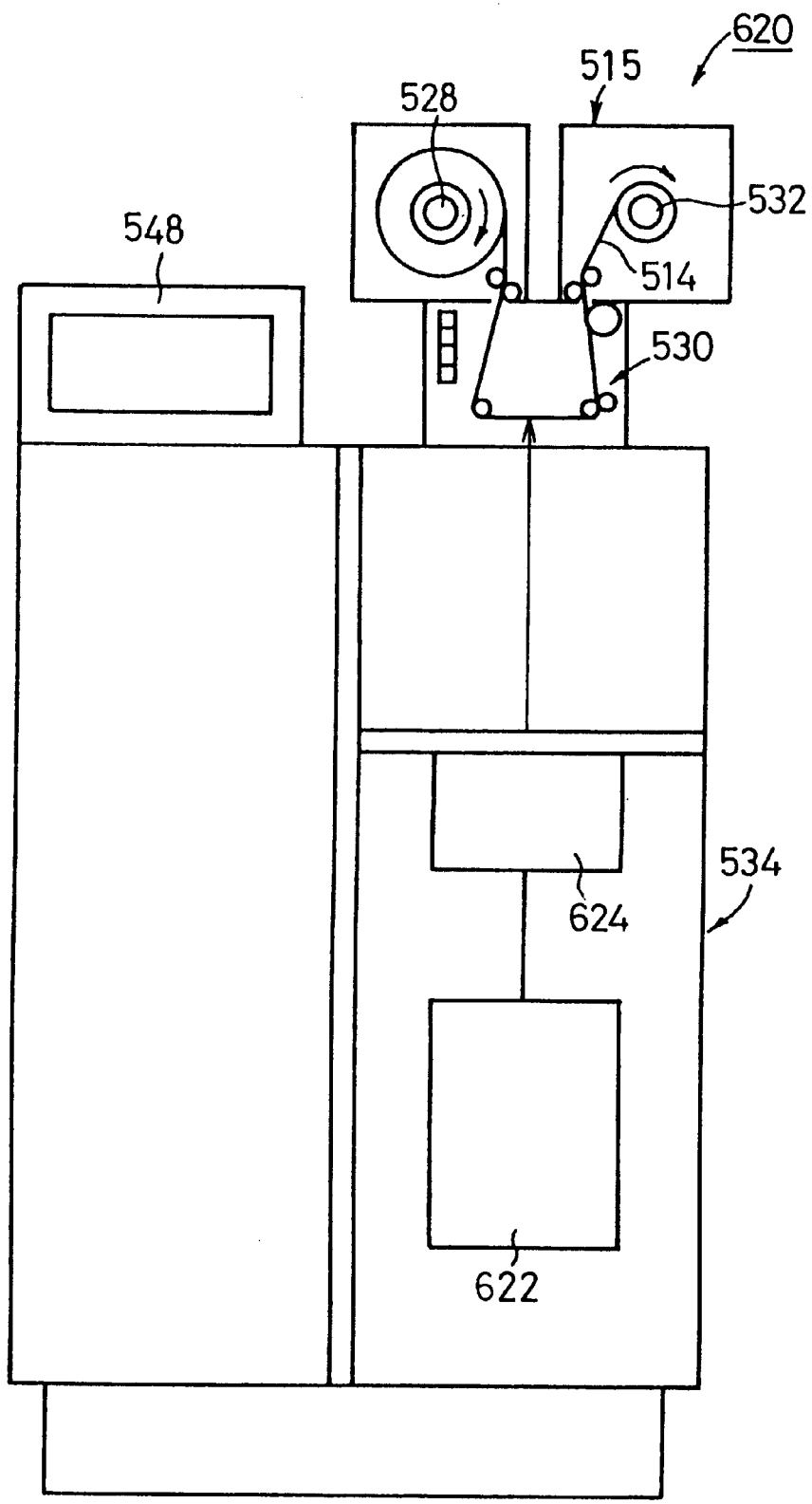

# PREEXPOSURE METHOD AND DEVICE FOR PHOTOSENSITIVE FILM

TECHNICAL FIELD

The present invention relates to a preexposure method and a preexposure apparatus for photosensitive films, wherein a film, which is wound and accommodated in a shield container such as a film cartridge or Patrone, is once drawn out to be exposed with a predetermined image, and then the film is rewound into the shield container.

BACKGROUND ART

It is known, for example, for a lens-equipped film that an image such as photograph, character, or letter is subjected to preexposure beforehand as a latent image on the film. This procedure is performed in order to prepare a photograph on which the preexposed image is combined with a part of a subject to be photographed with the lens-equipped film.

A variety of suggestions have been hitherto made concerning such a technique. Those known include, for example, a "preexposure method for photographic films" disclosed in Japanese Laid-Open Patent Publication No. 9-230448. In this conventional technique, at first, an aligned film strip is installed to a single use camera on which a shield mask is placed corresponding to an illustration portion. Exposure is performed by using the single use camera followed by development to form, on the aligned film strip, a transparent area corresponding to the shield portion of the shield mask and an opaque portion corresponding to the open portion.

Subsequently, the aligned film strip is charged in a copy camera. The illustration is arranged so that the illustration may be viewed through the transparent area. A photographing film strip is installed in the copy camera to photograph the illustration, followed by applying a development treatment. Thus, a manuscript film strip is obtained.

An unexposed film strip, which is charged on a film strip supply reel, is moved through a slot onto a winding reel. The slot comprises a contact base plate and an exposure plate. The unexposed film strip and the photographing film strip pass therethrough while allowing their surfaces to make contact with each other. During this process, a light source is turned on in a throttle. An image on the photographing film strip is recorded (subjected to preexposure) as a latent image on the unexposed film strip.

The conventional technique described above requires the operation to previously charge the unexposed film strip on the supply reel. Another operation is performed such that the unexposed film strip, which is fed from the supply reel, is wound around a winding reel, and then the unexposed film strip is wound and accommodated in a shield container such as a film cartridge or Patrone.

Therefore, dominant parts of the operation for forming the latent image on the unexposed film strip are performed manually. A problem is pointed out that it is not easy to realize the efficient entire operation and perform the operation automatically. Especially, in the case of the steps in which a large amount of lens-equipped films are produced, a considerable period of time is required for the preexposure operation, resulting in such an inconvenience that it is impossible to achieve any efficient operation for producing the lens-equipped film.

In the conventional technique described above, when the photographing film strip is prepared, the operation is performed to expose the photographing film strip with the illustration by photographing the illustration as an image for preexposure by using the copy camera. For this reason, a problem is pointed out that the entire operation for producing the photographing film strip is complicated and time-consuming.

In the conventional technique described above, the manuscript film strip is used to expose one unexposed film strip. For example, the film strip has twenty-four frames, and the manuscript is constructed to have a loop-shaped configuration (loop manuscript). The loop manuscript is placed with the film strip in the slot with their surfaces contacted with each other. In this state, the light source is turned on in the throttle, and thus the latent image is recorded on the unexposed film strip.

However, the loop manuscript is set to have a length corresponding to one individual of the unexposed film strip. Therefore, the loop manuscript contacts with the unexposed film strip for every one individual of the unexposed film strip. As a result, the following problems are pointed out. That is, the dust or the like tends to adhere to the loop manuscript with ease, the damage is apt to occur, and the durability is deteriorated.

Further, it is necessary to perform the position adjustment between the forward end of the loop manuscript and the unexposed film strip before starting the preexposure. It is required that the position adjustment operation is performed for even one individual of the unexposed film strip. For this reason, a problem arises that it is difficult to perform the preexposure treatment for the unexposed film strip continuously at a high speed.

The present invention has been made in order to solve such problems, an object of which is to provide a preexposure method and a preexposure apparatus for photosensitive films, which make it possible to preexpose the film with a desired image quickly and reliably, and achieve the entire automatic and efficient preexposure operation.

Another object of the present invention is to provide a preexposure method and a preexposure apparatus for photosensitive films, which make it possible to efficiently record, on a preexposure manuscript, a high quality image for performing preexposure on a film, and perform the preexposure operation highly accurately.

DISCLOSURE OF THE INVENTION

In a preexposure method and a preexposure apparatus for photosensitive films according to the present invention, a shield container, in which a photosensitive film is wound and accommodated, is held. The photosensitive film is automatically drawn from the shield container, and then the photosensitive film and an exposure section are relatively positioned. Further, a predetermined portion of the photosensitive film is exposed with an image by the aid of the exposure section, and then the photosensitive film is automatically wound and accommodated in the shield container.

Accordingly, the operation is automatically performed until the photosensitive film Is wound and accommodated In the shield container, after the photosensitive film is drawn from the shield container to preexpose the photosensitive film with the predetermined image. The entire preexposure operation for the photosensitive film is performed automatically and efficiently.

Further, the entire length of the photosensitive film is simultaneously exposed with the image in a state in which the surface of the photosensitive film disposed on a side opposite to the exposure surface is attracted and held over the entire length. Accordingly, it is possible to expose the photosensitive film with the desired image highly accurately at a high speed.

The photosensitive film is automatically drawn by a predetermined length from the shield container. The predetermined portion of the photosensitive film is exposed with the image. The foregoing steps are repeatedly performed for the entire photosensitive film. Accordingly, the preexposure operation is performed smoothly and reliably for a variety of photosensitive films having different numbers of frames. During this process, the photosensitive film is drawn by the predetermined length from the shield container. Even when the photosensitive film is lengthy, it is easy to respond to such a photosensitive film.

In the present invention, image data is prepared to form an image on a plurality of frames. The image data and a positioning reference are recorded on a sheet manuscript.

Subsequently, the sheet manuscript is arranged in a processing mechanism on the basis of the positioning reference. The sheet manuscript is cut into manuscript segments having a predetermined number of frames. A positioning site is formed on the manuscript segment. A plurality of manuscript segments are aligned on a holder member on the basis of the positioning reference. Thus, a preexposure manuscript is prepared.

As described above, the image data is directly recorded on the sheet manuscript. Therefore, it is possible to reliably prepare the preexposure manuscript having the image of high purity and high image quality. Further, the image data and the positioning reference are directly recorded on the sheet manuscript. Therefore, the manuscript segment, on which the image is highly accurately arranged at the desired position, can be formed by the cutting on the basis of the positioning reference. Further, a plurality of manuscript segments can be aligned correctly with respect to the holder member on the basis of the positioning site formed on the manuscript segment. Therefore, it is possible to efficiently prepare the preexposure manuscript on which the high quality images are arranged at the desired positions highly accurately. Furthermore, it is possible to form the image with different designs for each of the frames.

The sheet manuscript is attracted and held on a placing base which constitutes a processing mechanism. The positioning reference of the sheet manuscript is allowed to coincide with an illumination light beam radiated from an illumination means provided for the placing base. Accordingly, the sheet manuscript is positioned highly accurately on the placing base. In this state, a second blade member is moved back and forth in accordance with the action of an actuator. The sheet manuscript is cut by the aid of the first blade member and a second blade member provided for the placing base. Accordingly, the manuscript segment having the high quality is obtained. The positioning site is formed on the manuscript segment highly accurately.

In the present invention, a plurality of holding means for holding the shield container are provided. An index table is provided to successively transport the shield container to a film supply station, a film-drawing station, an exposure station, a winding station, and a withdrawing station. Accordingly, the shield container is successively arranged corresponding to the respective stations in accordance with the transport action of the index table in a state in which the shield container is held by each holding means. Thus, the preexposure operation is performed in a divided manner. Accordingly, it is possible to continuously process especially a large number of shield containers. It is easy to realize the efficient entire preexposure operation for the photosensitive film.

The index table is provided with a plurality of film-holding sections for attracting and holding the photosensitive film drawn from the shield container. At least in the film-drawing station and the exposure station, the film-holding section is advanced in accordance with the action of a driving means. Thus, it is possible to attract and hold the photosensitive film reliably and highly accurately.

The photosensitive film is drawn over its entire length from the shield container held by the holding means. Accordingly, the entire structure is effectively miniaturized. Further, especially when the index table is used, it is easy to simplify the structure.

In the film-drawing station, the photosensitive film is drawn by a predetermined length by the aid of a drawing means. A holder member for holding the preexposure manuscript is moved in the drawing direction for the photosensitive film in synchronization with the drawing means. Every predetermined length of the photosensitive film is exposed with the image. Therefore, the photosensitive film and the preexposure manuscript are mutually positioned correctly. The entire length of the photosensitive film can be exposed with the desired image highly accurately.

In the present invention, a preexposure manuscript is prepared, which is constructed by a reversal film to be recorded with an image thereon and which has a length corresponding to a plurality of photosensitive films. The preexposure manuscript is formed to have a loop-shaped configuration, and it is arranged in an exposure section. Subsequently, in the exposure section, in a state in which a part of the photosensitive film is overlapped with a part of the preexposure manuscript, a predetermined portion of the photosensitive film is exposed with the image while allowing the preexposure manuscript to make circumscribing movement.

Accordingly, the plurality of photosensitive films can be continuously exposed with the image by the aid of the preexposure manuscript. It is easy to achieve a high speed of the preexposure treatment. Further, the adhesion of dust or the like and the occurrence of damage is effectively decreased, the durability is improved, and the highly accurate preexposure treatment is continuously performed, as compared with a case in which a preexposure manuscript set to have a length corresponding to one photosensitive film is used.

Further, the exposure section is provided with an exposure drum which is engaged with a part of the preexposure manuscript. The preexposure manuscript is allowed to run at a high speed in a circumscribing manner in accordance with the rotary action of the exposure drum. In this arrangement, the exposure drum is provided with a sprocket section which is rotated while making engagement with perforations of the preexposure manuscript and the photosensitive film, and a fixed aperture member which is exchangeable and which has an exposure window for regulating the exposure range of the preexposure manuscript. Therefore, the high speed preexposure treatment is performed highly accurately in a state in which the preexposure manuscript and the photosensitive film are allowed to make tight contact in a reliable manner. Further, the fixed aperture member is formed to be exchangeable. Therefore, for example, when the preexposure or the entire surface exposure is performed for the photosensitive film, it is possible to easily respond to a desired portion of the photosensitive film only by exchanging the fixed aperture member.

The exposure treatment is started by the exposure section after the adjustment of respective notches provided for the preexposure manuscript and the photosensitive film. Therefore, it is possible to perform the tight contact exposure at a high speed while making correct coincidence of the relative positions of the preexposure manuscript and the photosensitive film.

A manuscript design is prepared with digital data. The digital data is directly recorded on a reversal film to prepare a preexposure manuscript. Accordingly, it is possible to quickly prepare the preexposure manuscript having high quality. It is easy to achieve the efficient entire operation. Further, it is easy to form images having different designs for respective frames. It is easy to respond to animation as well. Thus, the versatility is improved.

BRIEF DESCRIPTION OF THE DRAWINGS

FIG. 18 illustrates an image data-preparing mechanism and a recording mechanism for directly recording image data on the preexposure manuscript;

FIG. 22 shows an exploded perspective view illustrating a manuscript holder for holding the preexposure manuscript;

FIG. 36 illustrates a schematic arrangement of an image-preparing mechanism which constitutes a preexposure apparatus according to a fourth embodiment of the present invention.

BEST MODE FOR CARRYING OUT THE INVENTION

Figure 1:
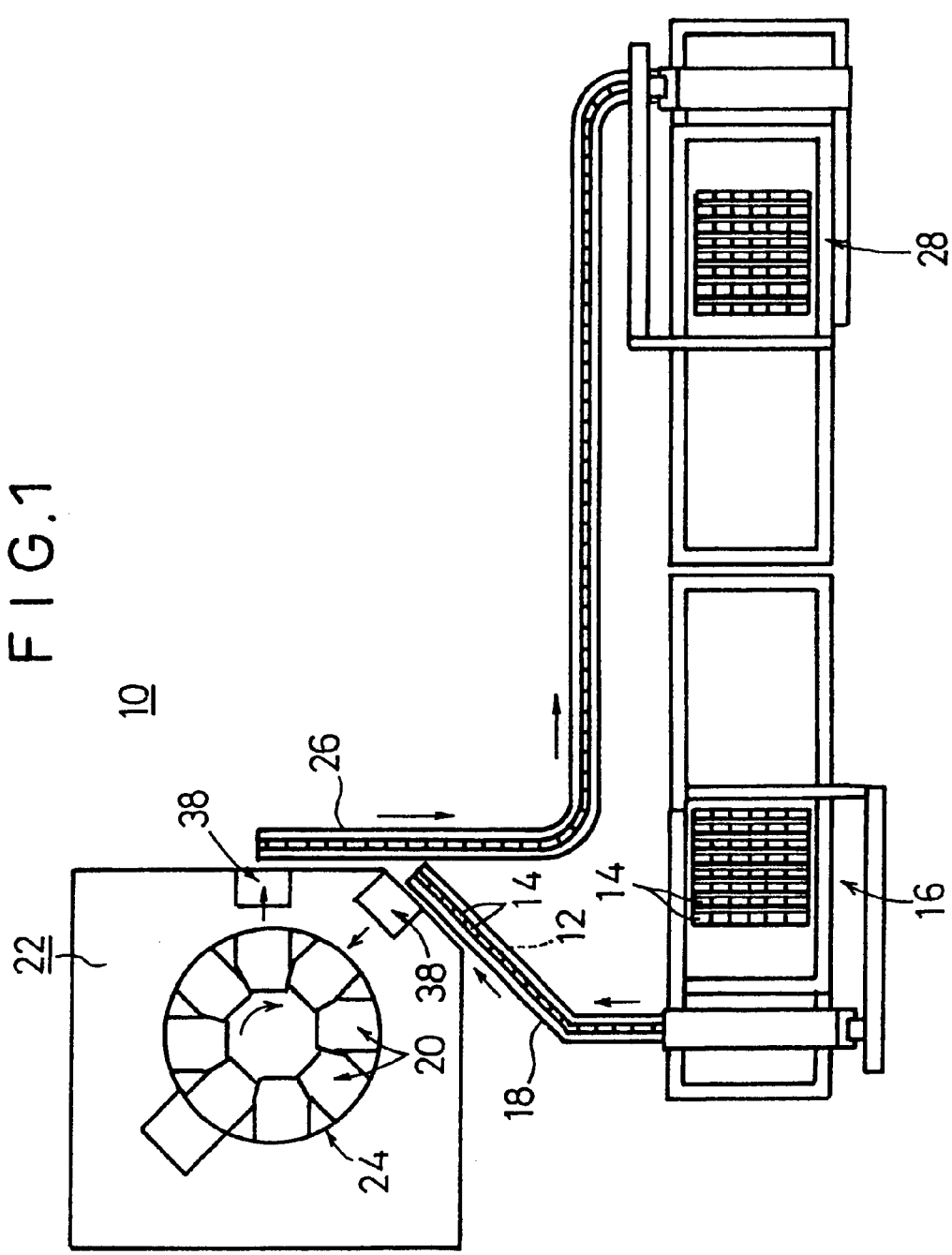
FIG. 1 shows a schematic plan view illustrating a preexposure apparatus for carrying out a preexposure method for photosensitive films according to a first embodiment of the present invention.
Figure 2:
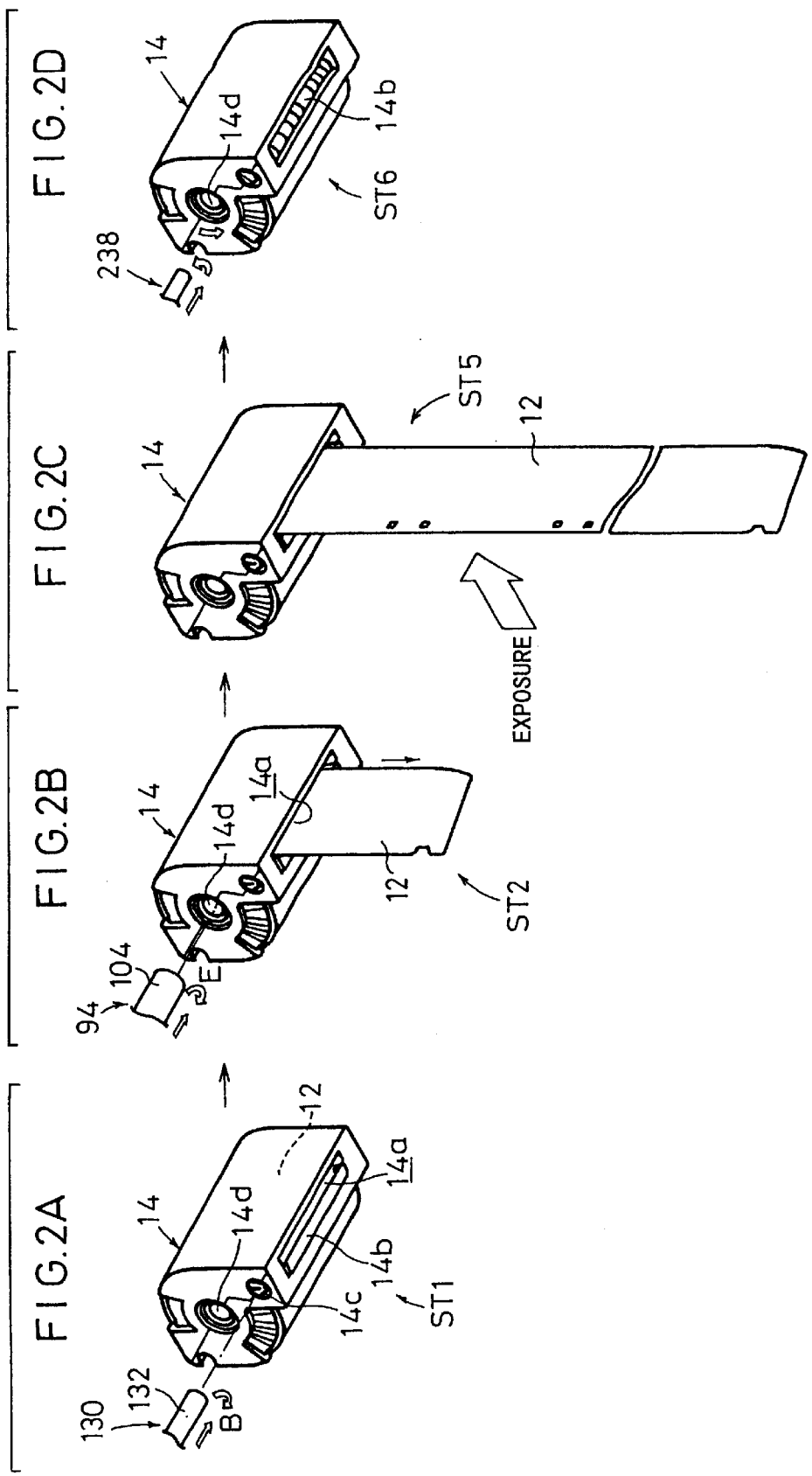
FIGS. 2A to 2D illustrate the operation of the preexposure method.

FIG. 1 shows a schematic plan view illustrating a preexposure apparatus 10 for carrying out a preexposure method for photosensitive films according to a first embodiment of the present invention, and FIG. 2 illustrates the operation of the preexposure method.

As shown in FIGS. 2A to 2D, a film cartridge (shield container) 14 as an APS film has a lid 14b capable of opening and closing an opening 14a for drawing a film 12. The lid 14b is provided integrally with a lock mechanism-equipped rotary shaft 14c. The film 12 is wound around a rewinding shaft 14d in the film cartridge 14. The rewinding shaft 14d and the rotary shaft 14c are exposed to the outside of the film cartridge 14 so that they are freely operated.

The preexposure apparatus 10 comprises a film supply section 16 to which the film cartridges 14 each containing the unexposed photosensitive film 12 wound and accommodated therein are supplied in an aligned manner, a supply conveyer 18 for feeding the film cartridges 14 one by one from the film supply section 16, and eight holding means 20 for holding the film cartridges 14 fed by the supply conveyer 18. The preexposure apparatus 10 further comprises an index table 24 which is rotated intermittently in the direction of the arrow in a darkroom 22, a withdrawing conveyer 26 for withdrawing the film cartridge 14 one by one taken out of the index table 24, and a film-stacking section 28 for aligning and stacking the film cartridges 14 withdrawn by the withdrawing conveyer 26.

Figure 3:
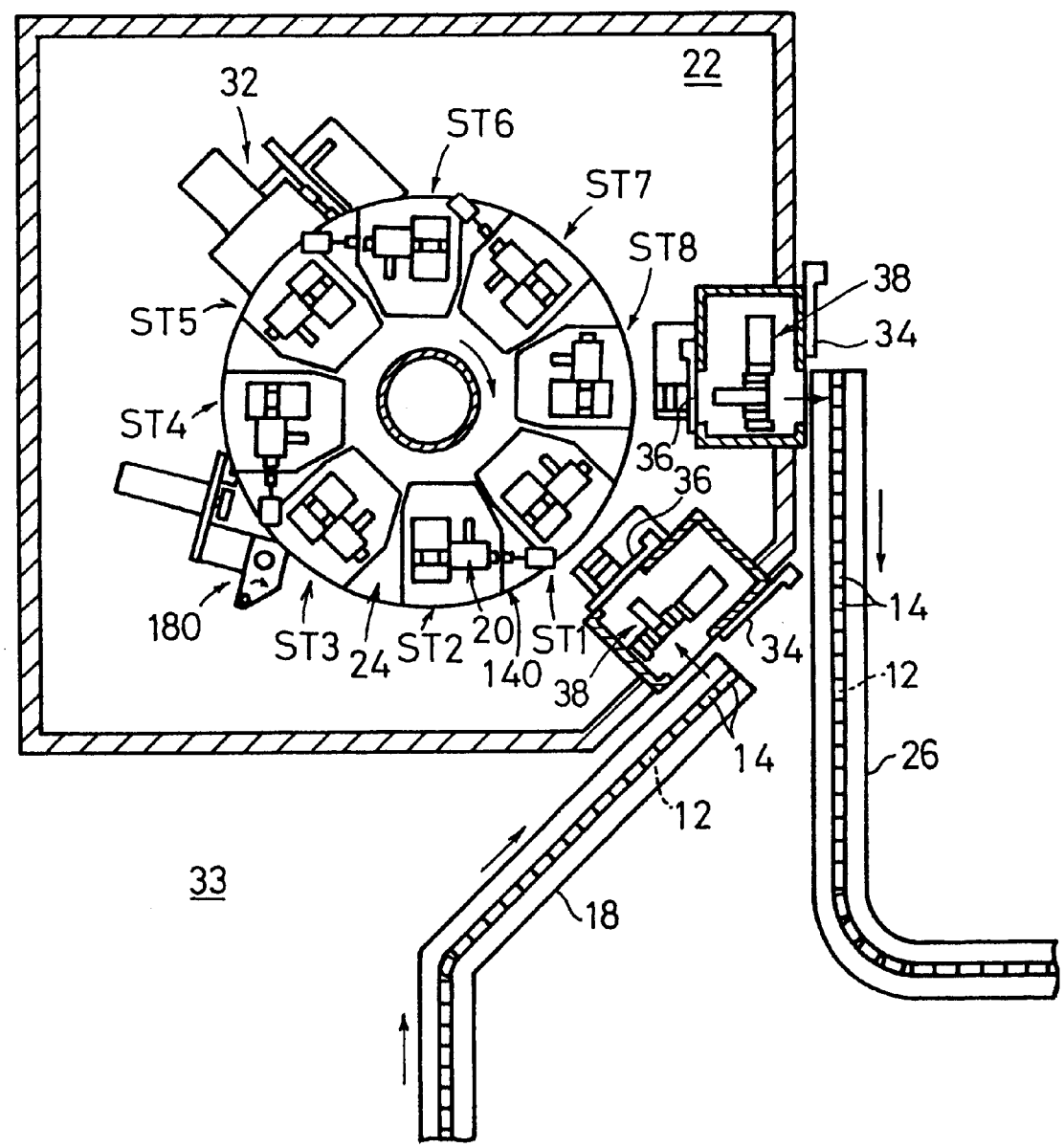
FIG. 3 shows a plan view illustrating major components of the preexposure apparatus.

As shown in FIG. 3, the film cartridges 14 are arranged in the darkroom 22 corresponding to respective stop positions of the index table 24. Those provided in the darkroom 22 are a film supply station ST1 for opening the lid 14b of the film cartridge 14, a film forward end-protruding station ST2 for unwinding, by a predetermined length, the forward end of the film 12 from the film cartridge 14, a film-drawing station ST3 for automatically drawing the entire length of the film 12 in the vertical direction from the film cartridge 14, a positioning station ST4 for positioning the exposure position of the drawn film 12, an exposure station ST5 for relatively positioning the positioned film 12 and an exposure section 32 to expose a predetermined portion of the film 12 with an image by the aid of the exposure section 32, a winding station ST6 for automatically rewinding the film 12 after the exposure into the film cartridge 14, a position adjustment station ST7 for performing position adjustment for a state indicator (to indicate, for example, "unused" or "in use") of the film cartridge 14 around which the film 12 is rewound, and a withdrawing station ST8 for closing the lid 14b of the film cartridge 14 to withdraw the film cartridge 14.

Figure 4:
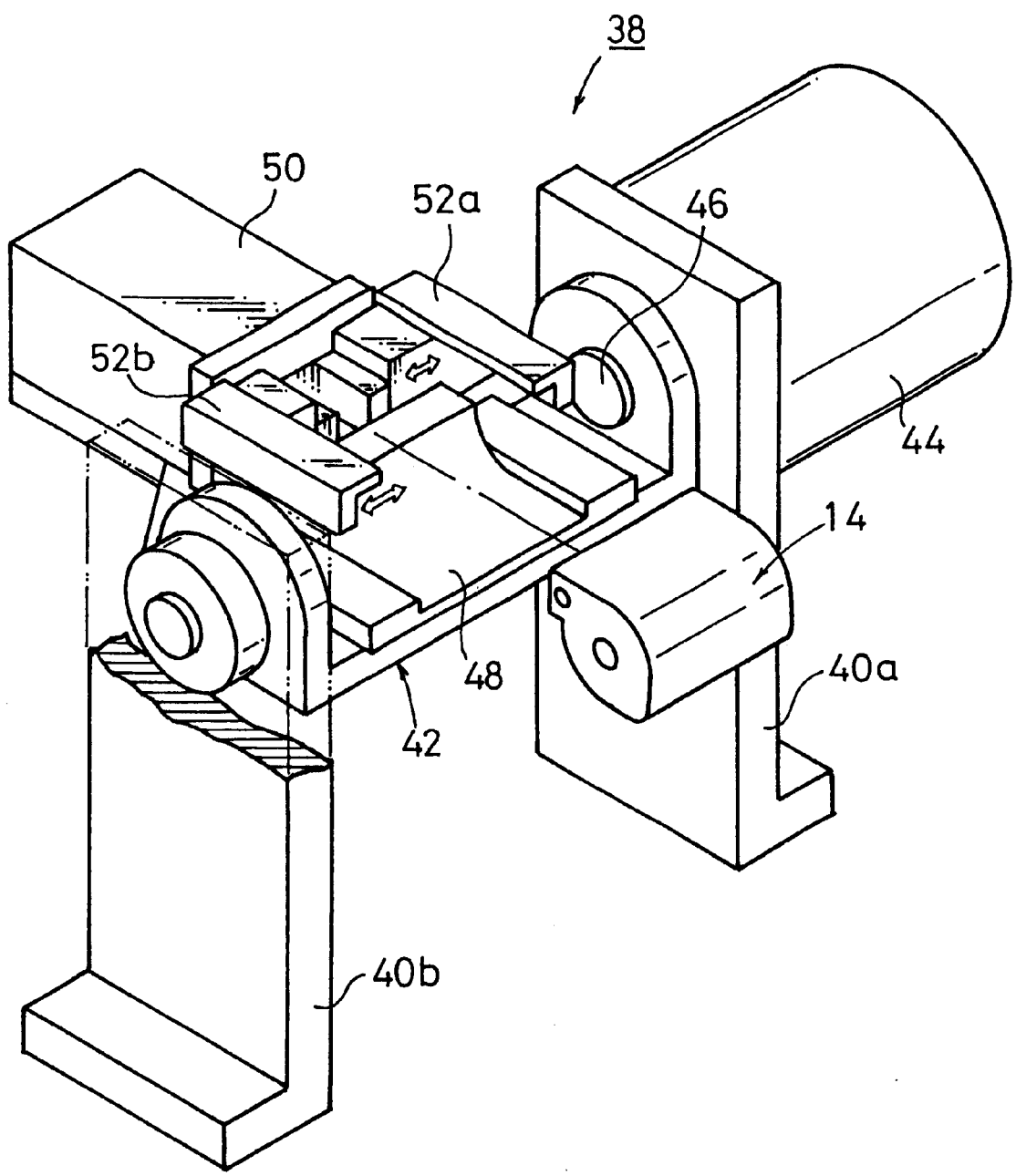
FIG. 4 shows a perspective view illustrating, with partial cutout, a cartridge attitude-changing means which constitutes the preexposure apparatus.

A first shutter means 34 and a second shutter means 36, which are capable of shielding the dark room 22 from a lighted room 33 when the film cartridge 14 is introduced into the dark room 22, is provided between the forward end of the supply conveyer 18 and the film supply station ST1. A cartridge attitude-changing means 38 is arranged between the first and second shutter means 34, 36. As shown in FIG. 4, the cartridge attitude-changing means 38 includes a pair of support plates 40a, 40b. A swingable stand 42 is installed swingably to upper portions of the support plates 40a, 40b. A motor 44 is provided for the support plate 40a. A rotary shaft 46 of the motor 44 is secured to a first end of the swingable stand 42. A placing section 48 for placing the film cartridge 14 while maintaining its transport attitude is formed on the swingable stand 42. An air chuck 50 is installed to the swingable stand 42. The air chuck 50 is provided with a pair of gripping members 52a, 52b capable of gripping the film cartridge 14 at its both end surfaces by being driven so that they are opened and closed with each other.

Figure 5:
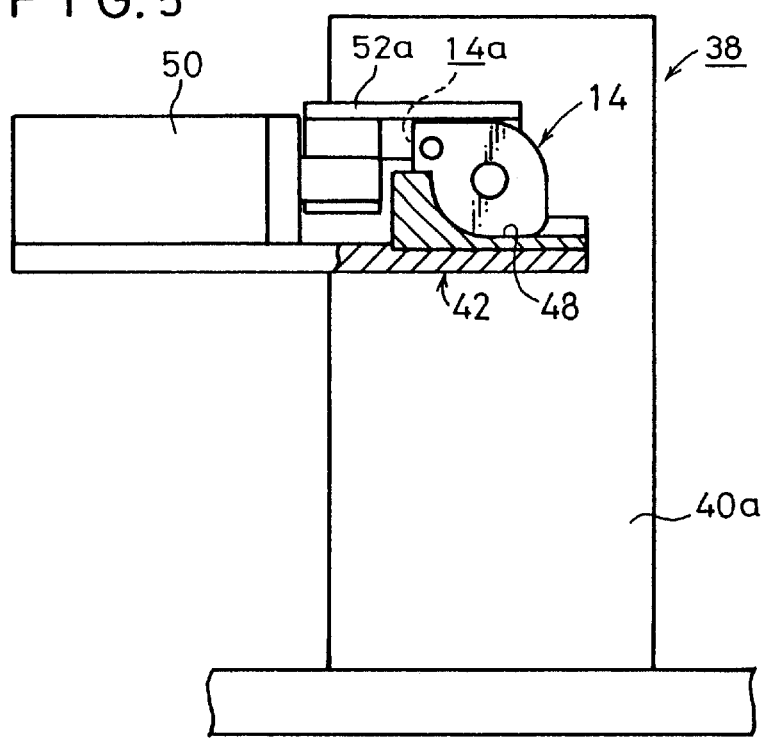
FIG. 5 shows a side view illustrating, with partial cross section, the cartridge attitude-changing means.
Figure 6:
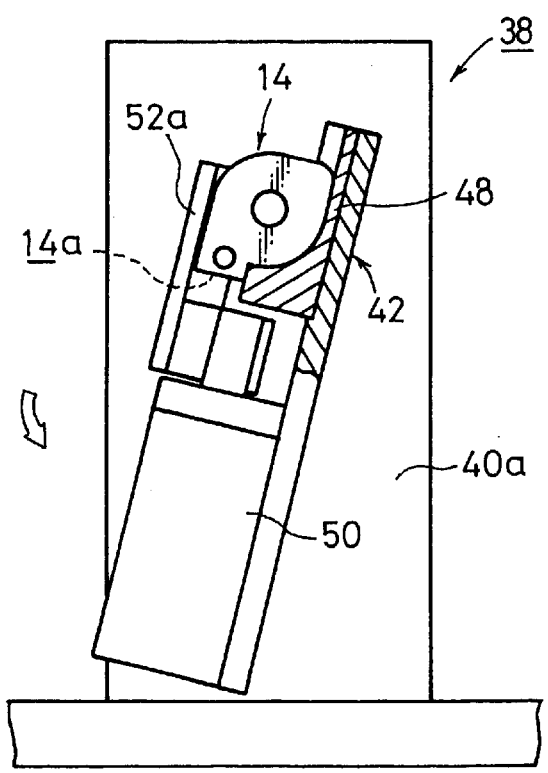
FIG. 6 shows a side view illustrating, with partial cross section, the operation of the cartridge attitude-changing means.

As shown in FIGS. 4 and 5, the cartridge attitude-changing means 38 functions such that the film cartridge 14, which is fed with the transport attitude with the opening 14a directed in the horizontal direction, is rotated by a predetermined angle to effect the attitude transformation so that the opening 14a is directed in the downward direction (see FIG. 6).

Figure 7:
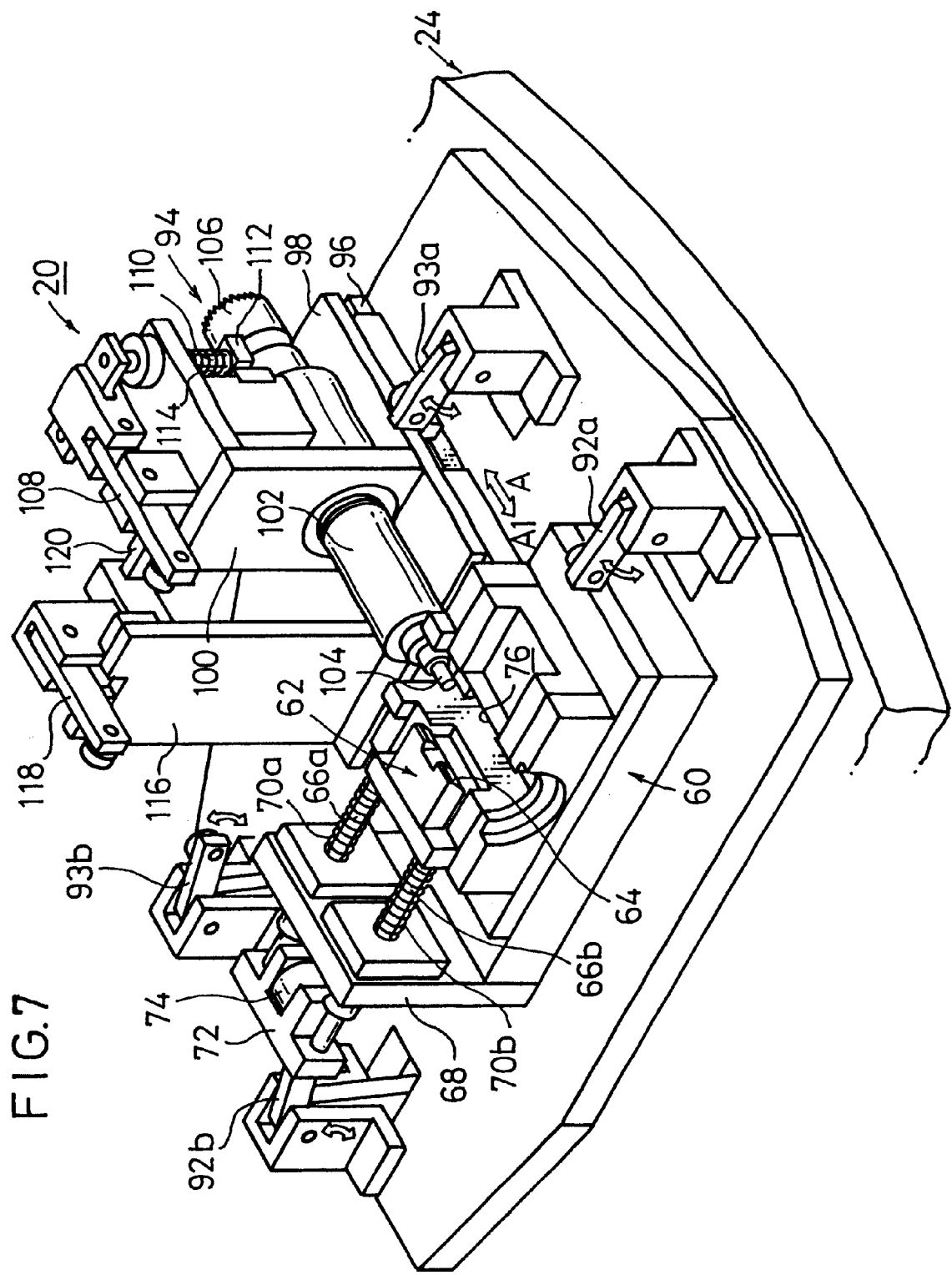
FIG. 7 shows a perspective view illustrating a holding means provided on an index table.

As shown in FIG. 7, the holding means 20 comprises a placing stand 60 which is fixed on the index table 24. The placing stand 60 is designed to have such a configuration that the film cartridge 14, which is fed with the opening 14a directed in the downward direction, may be held while maintaining the attitude. A movable pressing member 62 is arranged corresponding to the side surface of the film cartridge 14.

Figure 8:
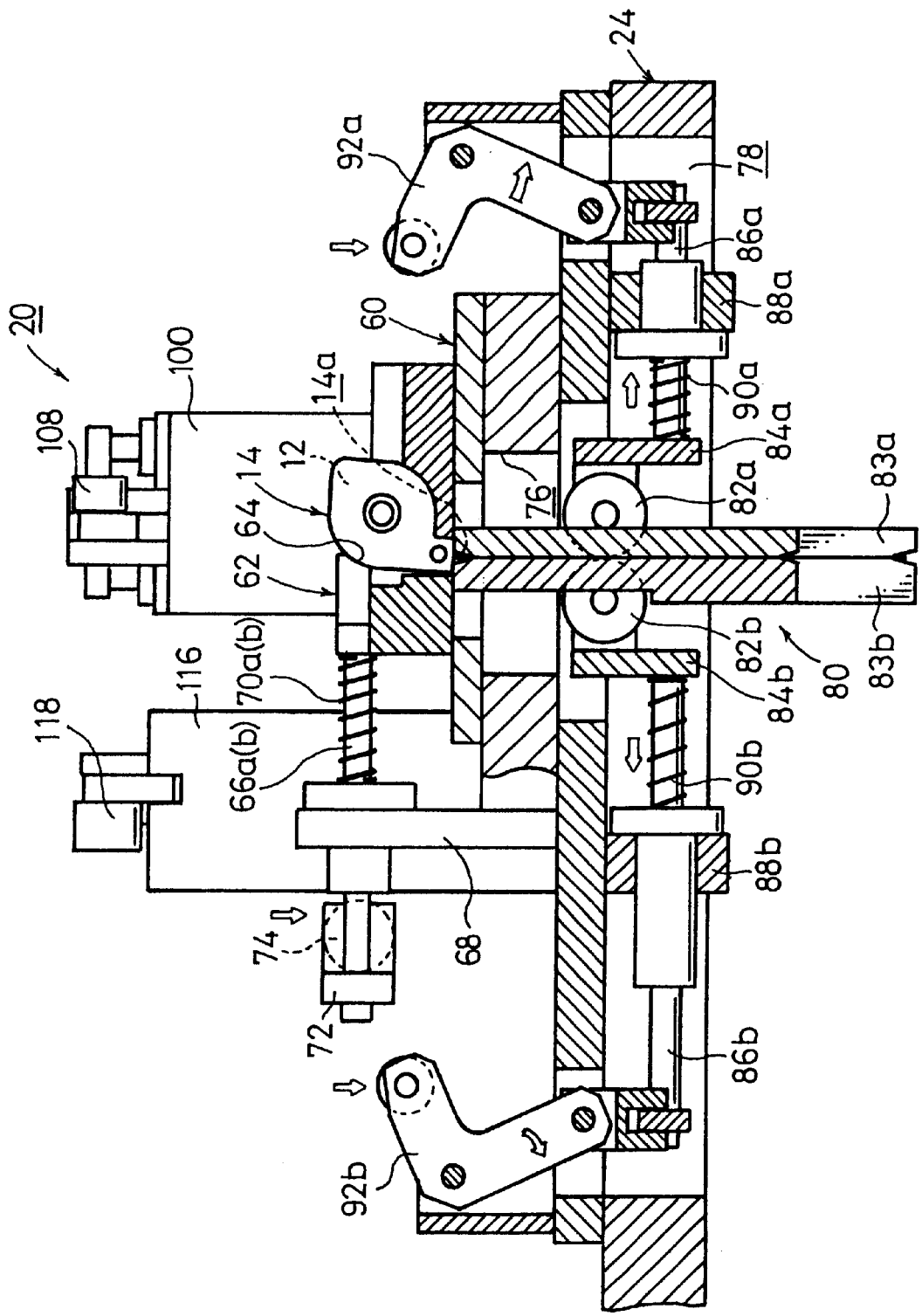
FIG. 8 shows a front view illustrating the holding means.

As shown in FIGS. 7 and 8, a pressing surface 64, which corresponds to the shape of the side surface of the film cartridge 14, is provided at the forward end of the movable pressing member 62. First ends of a pair of rods 66a, 66b are fixed to the rearward end of the movable pressing member 62. The rods 66a, 66b penetrate through a plate member 68 to protrude rearwardly. Springs 70a, 70b are interposed between the plate member 68 and the movable pressing member 62. The rearward ends of the rods 66a, 66b are connected to a connection plate 72. The connection plate 72 is installed with a cam roller 74 for making engagement with an unillustrated cam member to move the movable pressing member 62 frontwardly and rearwardly with respect to the film cartridge 14.

The placing stand 60 is formed with an opening 76 so that the film 12, which is drawn from the film cartridge 14 placed on the placing stand 60, is allowed to penetrate therethrough. The index table 24 is formed with an opening 78 corresponding to the opening 76. A film-gripping means 80 corresponding to the opening 78 is arranged at the bottom surface of the index table 24.

As shown in FIG. 8, the film-gripping means 80 includes pairs of rollers 82a, 82b and interposing plates 83a, 83b which are capable of interposing the forward end of the film 12 drawn from the film cartridge 14 under the film cartridge 14. The rollers 82a, 82b are provided on brackets 84a, 84b. Rods 86a, 86b, which are fixed to the brackets 84a, 84b, are slidably fitted to attachment sections 88a, 88b of the index table 24. Springs 90a, 90b are allowed to intervene between the attachment sections 88a, 88b and the brackets 84a, 84b.

Cam means 92a, 92b are engaged with the rods 86a, 86b. The cam means 92a, 92b make swinging movement by the aid of an unillustrated driving cam member. The rollers 82a, 82b are moved in opening and closing directions by the aid of the rods 86a, 86b connected to the cam means 92a, 92b. The interposing plates 83a, 83b are constructed such that they may be opened and closed in accordance with the action of the cam means 93a, 93b in the same manner as the rollers 82a, 82b (see FIG. 7).

A rotating means 94, which is engageable with the rewinding shaft 14d of the film cartridge 14, is arranged in the vicinity of the placing stand 60 on the index table 24. As shown in FIG. 7, the rotating means 94 includes a slide table 98 which is movable frontwardly and rearwardly in the direction of the arrow A along a rail 96 provided on the index table 24. A spindle 102 is rotatably supported by a support plate 100 which is provided on the slide table 98 in an upstanding manner. A rotary pin 104 for making engagement with the rewinding shaft 14d of the film cartridge 14 is connected to the forward end of the spindle 102. A cylindrical clutch member 106, which has teeth at its end surface, is provided at the rearward end of the spindle 102.

A cam means 108 is provided on the support plate 100. A sliding member 112, which is used to press the outer circumferential surface of the spindle 102 to stop the rotation of the spindle 102, is secured to a rod 110 connected to the cam means 108. A spring 114 is engaged with the sliding member 112. A fixed support plate 116 is provided in juxtaposition with the slide table 98. A first end of a rod-shaped member 120 is connected via the cam means 118 to the fixed support plate 116. A second end of the rod-shaped member 120 is fixed to the support plate 100. The rod-shaped member 120 functions such that the slide table 98 is moved frontwardly and rearwardly in the direction of the arrow A with respect to the placing stand 60 by the aid of the cam means 118.

As shown in FIG. 2A, the film supply station ST1 is arranged with a lid-opening means 130 for opening the lid 14b of the film cartridge 14 arranged on the holding means 20. The lid-opening means 130 is provided with a rotary pin 132 for making engagement with the rotary shaft 14c provided integrally with the lid 14b to unlock the rotary shaft 14c so that the lid 14b is rotated by a predetermined angle to open the opening 14a. The rotary pin 132 is movable frontwardly and rearwardly with respect to the rotary shaft 14c by the aid of an unillustrated actuator, and it is rotatable in the direction of the arrow B.

Figure 9:
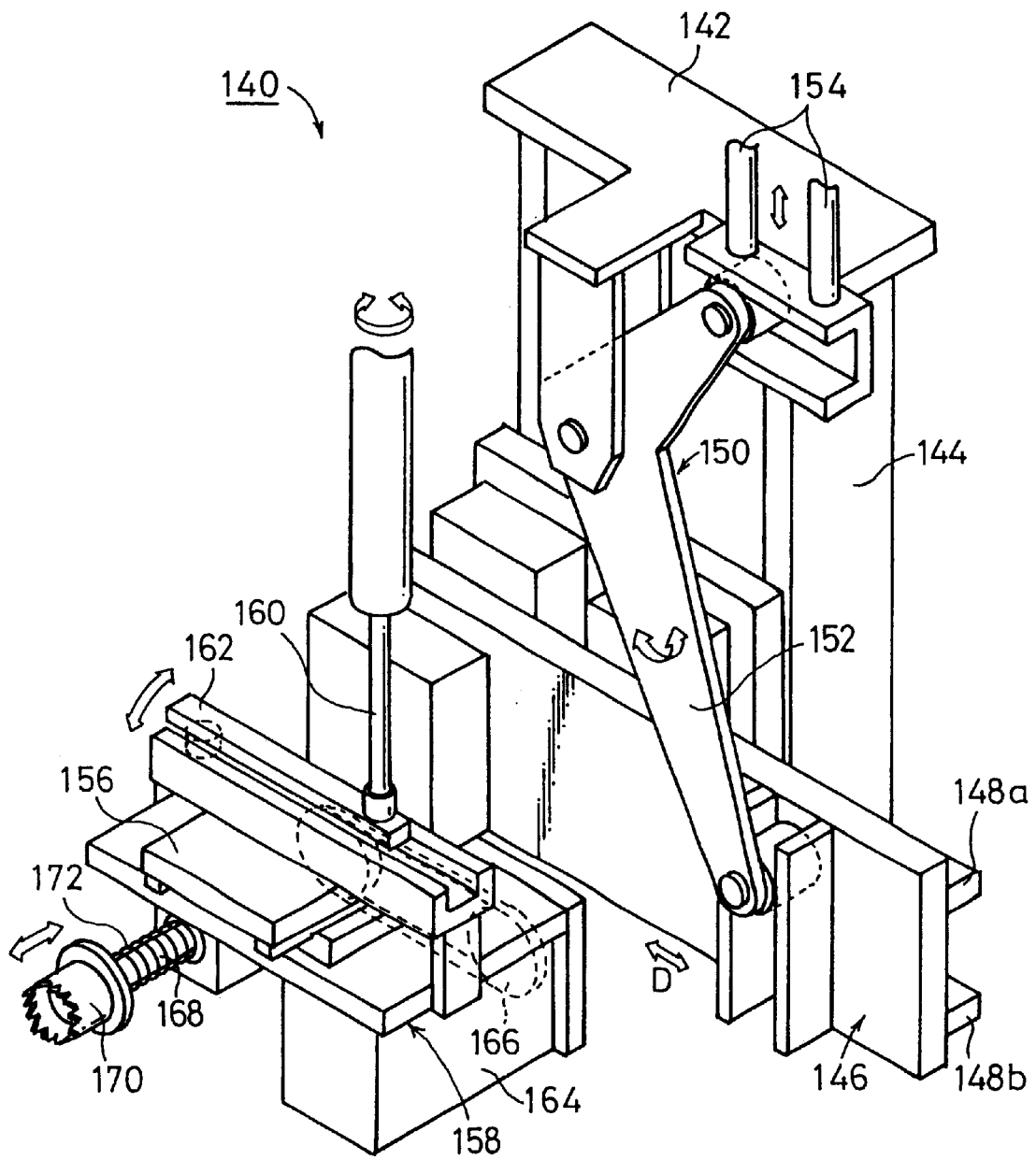
FIG. 9 shows a perspective view illustrating a forward end-protruding means which constitutes the preexposure apparatus.

As shown in FIG. 9, a forward end-protruding means 140 is arranged in the film forward end-protruding station ST2. The forward end-protruding means 140 is provided with a guide member 144 which is fixed to a plate-shaped fixing member 142 extending in the horizontal direction and which extends in the vertical direction. A movable stand 146 is supported by the guide member 144 movably frontwardly and rearwardly in the horizontal direction. A pair of rails 148a, 148b extending in the horizontal direction are fixed to the movable stand 146. The rails 148a, 148b are supported by the guide member 144. A first end of a swinging arm 152, which constitutes a cam means 150, is engaged with the movable stand 146. Cam rods 154, which are movable in upward and downward directions, are arranged at a second end of the swinging arm 152.

A sliding member 158 is supported movably frontwardly and rearwardly by the movable stand 146 via a horizontal guide plate 156. The sliding member 158 is movable frontwardly and rearwardly by the aid of a swinging arm 162 which is connected to a rotary cam 160 and which is swingable. A motor 164 is installed to the bottom surface of the sliding member 158. The motor 164 is connected to a driving shaft 168 via a belt-pulley means 166. A cylindrical clutch member 170 is installed movably frontwardly and rearwardly to the driving shaft 168 via a spring 172. The end surface of the clutch member 170 is formed to have a teeth-shaped configuration, and it is capable of being meshed with the clutch member 106 which constitutes the rotating means 94.

Figure 10:
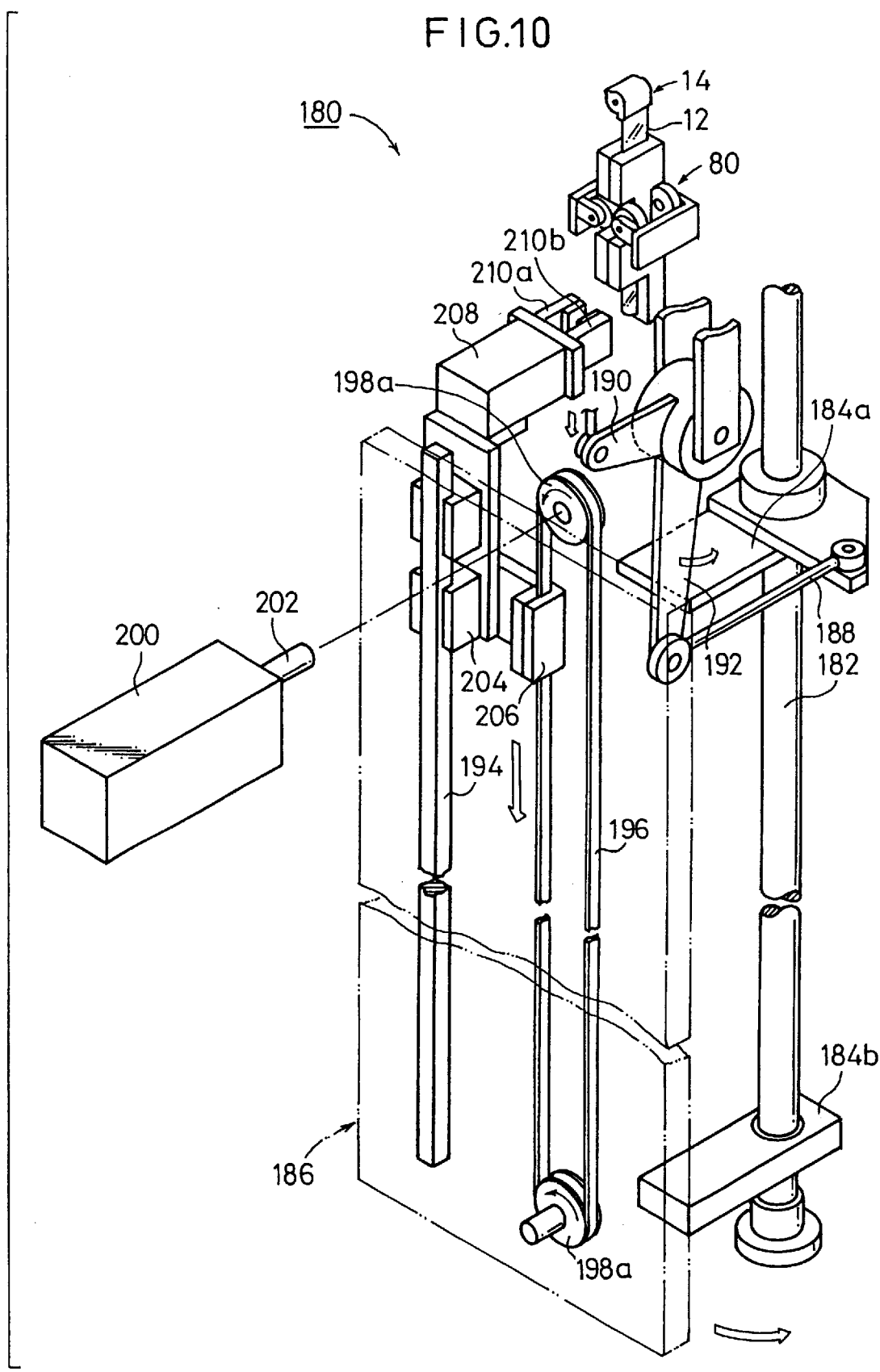
FIG. 10 shows a perspective view illustrating, with partial omission, a drawing means which constitutes the preexposure apparatus.

As shown in FIG. 10, a drawing means 180 is arranged for the film-drawing station ST3. The drawing means 180 includes a support shaft 182 which extends in the vertical direction. A main body 186 is installed swingably to the support shaft 182 by the aid of brackets 184a, 184b. A first end of a cam rod 188 is engaged with the bracket 184a. An end of an arm member 192, which constitutes a cam means 190, is connected to a second end of the cam rod 188. The arm member 192 makes swinging movement in accordance with the action of the cam means 190, and thus the main body 186 makes swinging movement about a support point of the support shaft 182.

A guide bar 194 and an endless belt 196, which are directed in the vertical direction, are arranged in the main body 186. Pulleys 198a, 198b are provided at both upper and lower ends of the endless belt 196. A driving shaft 202 of a motor 200 is fixed to the pulley 198a. The guide bar 194 is arranged with an elevator stand 204. A connecting member 206, which is fixed to the endless belt 196, is secured to the elevator stand 204.

An air chuck 208, which is directed in the horizontal direction, is arranged at the upper end of the elevator stand 204. A pair of gripping sections 210a, 210b, which constitute the air chuck 208, are capable of interposing the forward end of the film 12. The elevating stroke of the elevator stand 204 is set corresponding to the total length of the film 12 which is wound and accommodated in the film cartridge 14. The elevating stroke is set such that the amount of all frames of the film 12 may be drawn corresponding to the exposure section 32 as described later on.

Figure 11:
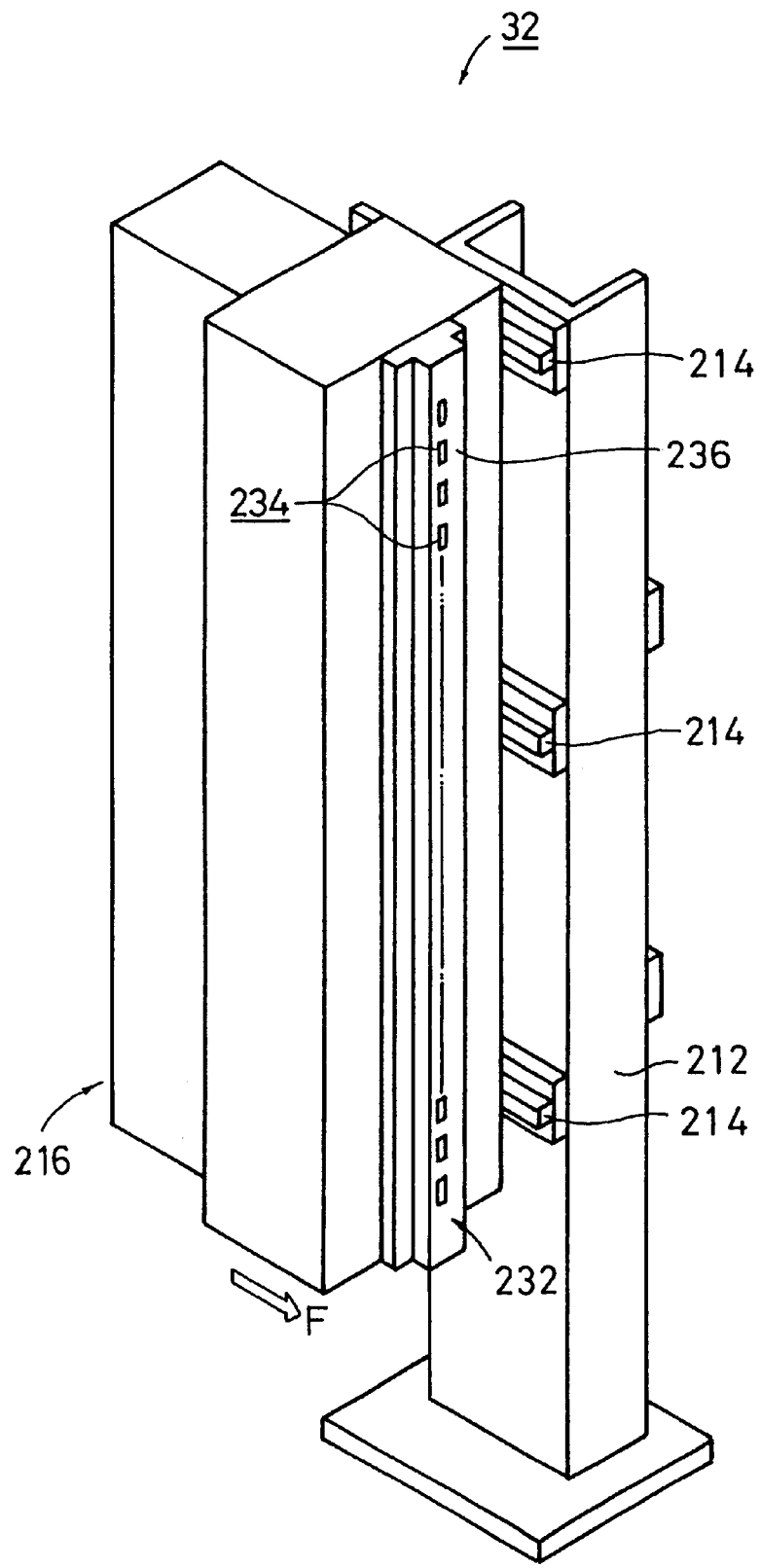
FIG. 11 shows a perspective view illustrating an exposure section which constitutes the preexposure apparatus.
Figure 12:
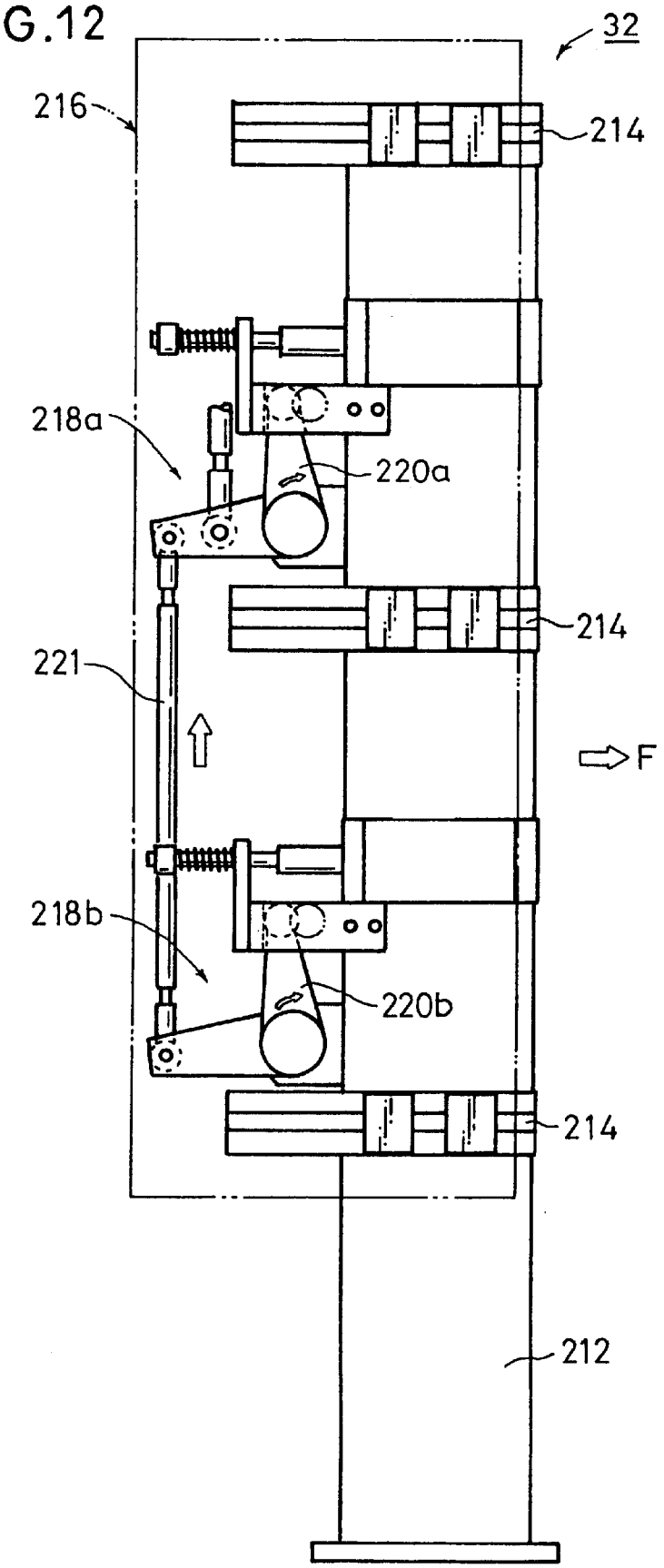
FIG. 12 shows a side view illustrating a side surface of the exposure section.

As shown in FIGS. 11 and 12, the exposure section 32 is arranged in the exposure station ST5. The exposure section 32 includes a support pillar 212. A main exposure unit 216 is supported movably frontwardly and rearwardly along a plurality of rails 214 which are provided on the support pillar 212 in the horizontal direction. As shown in FIG. 12, swinging arms 220a, 220b, which constitute cam means 218a, 218b, are connected to the main exposure unit 216. The swinging arms 220a, 220b are connected integrally by the aid of a connecting rod 221.

Figure 13:
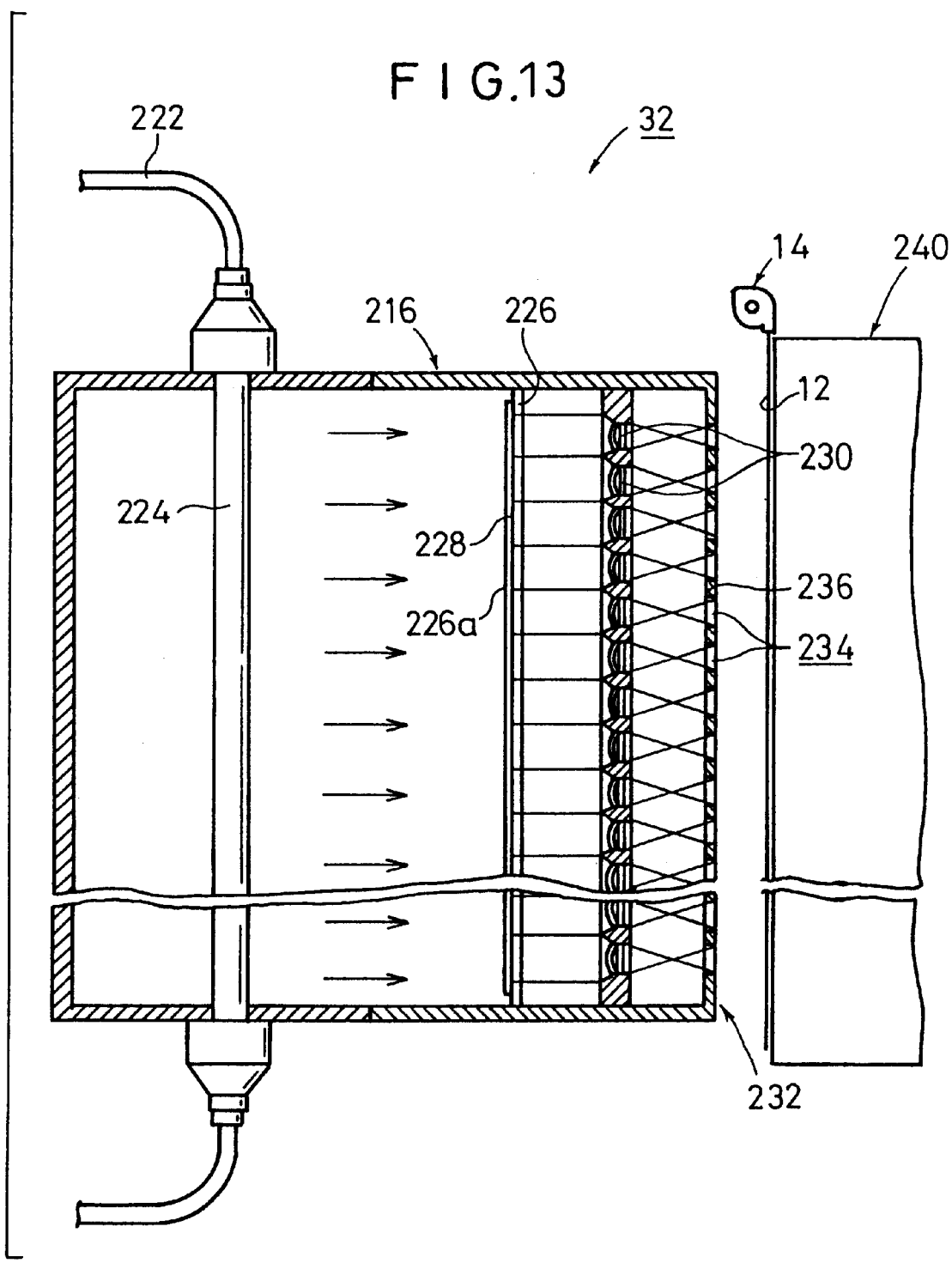
FIG. 13 shows a longitudinal sectional view illustrating the exposure section.

As shown in FIG. 13, a conduction light 224, which is connected via a fiber 222 to an unillustrated power source box, is installed at the inside of the main exposure unit 216 so that the conduction light 224 is directed in the vertical direction. A manuscript 228 for preexposure is arranged in front of the conduction light 224 by being held by a manuscript holder 226 as described later on. Lenses 230 are arranged in front of the manuscript 228. The number of the lenses 230 corresponds to the number of frames of the film 12. For example, the film 12 has twenty-five frames, twenty-five lenses 230 are arranged in the vertical direction.

An aperture 232, which is the positioning reference for relatively positioning the film 12 and the manuscript 228, is formed in front of the lenses 230. As shown in FIGS. 11 and 13, the aperture 232 is formed with a plurality of exposure windows 234 which are arranged on a shield section 236 in the vertical direction. Each of the exposure windows 234 is set corresponding to the predetermined position of each of the frames of the film 12.

A driving means is provided for each of the positioning station ST4 and the winding station ST6. The structure of the driving means is similar to the forward end-protruding means 140 which is provided for the film forward end-protruding station ST2. Therefore, detailed explanation of the driving means is omitted. A lid-closing means 238, which is constructed in the same manner as the lid-opening means 130 provided for the film supply station ST1, is provided for the withdrawing station ST8 (see FIG. 2D). A cartridge attitude-changing means 38, which is provided with a first shutter means 34 and a second shutter means 36, is provided between the withdrawing station ST8 and the withdrawing conveyer 26 (see FIG. 3).

Figure 14:
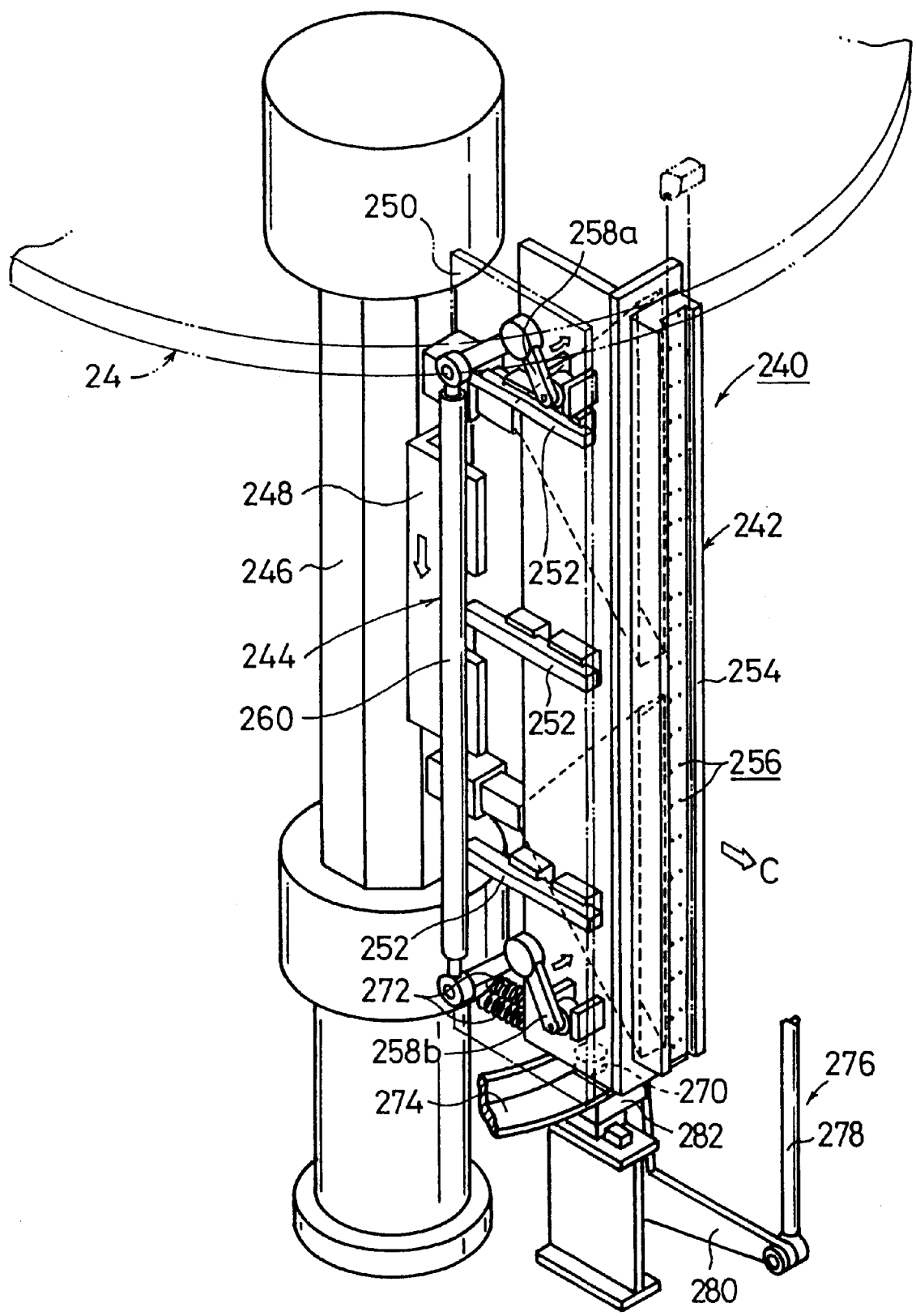
FIG. 14 shows a perspective view illustrating a film-holding section which constitutes the preexposure apparatus.

Eight film-holding sections 240 corresponding to the respective stations are installed for the index table 24 movably frontwardly and rearwardly in the radial direction. As shown in FIG. 14, the film-holding section 240 is constructed to have a long size in the vertical direction corresponding to the length of the film 12 drawn from the film cartridge 14. The film-holding section 240 includes a suction means 242 communicating with a vacuum source (not shown) for attracting and holding the film 12, and a driving means 244 for moving the suction means 242 frontwardly and rearwardly in the radial direction of the index table 24.

An octagonal prism-shaped member 246, which is rotatable integrally with the index table 24, is provided with an angle member 248. A support plate 250 is fixed to the angle member 248. The support plate 250 extends in the vertical direction. For example, three steps of guide rails 252 are fixed to the side surface of the support plate 250. A suction box 254 is supported by the guide rails 252 movably frontwardly and rearwardly in the horizontal direction (direction of the arrow C). A plurality of suction ports 256 are formed on the front surface of the suction box 254. The suction ports 256 communicate with the unillustrated vacuum source.

Figure 15:
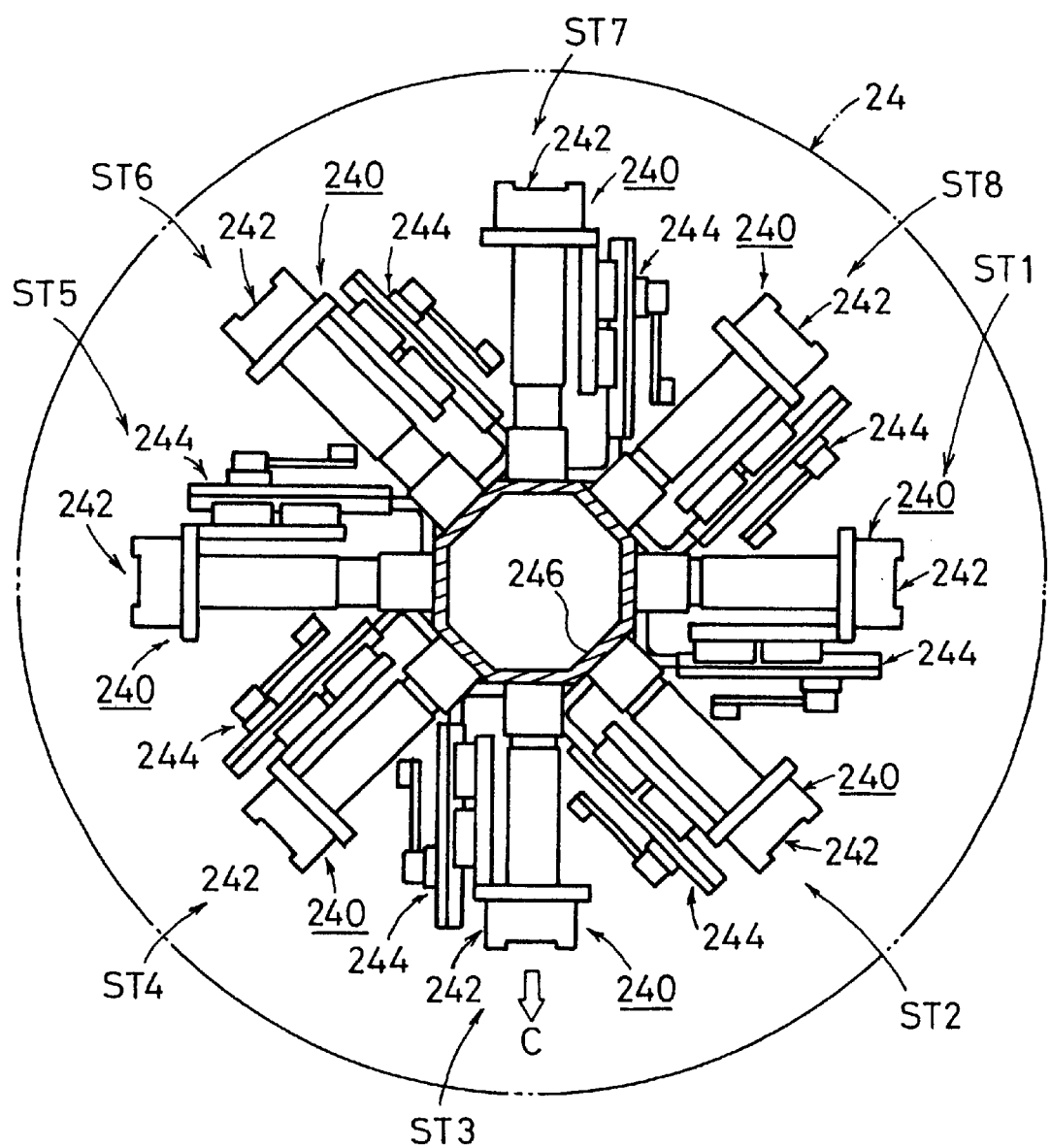
FIG. 15 shows a plan view illustrating the film-holding section.
Figure 16:
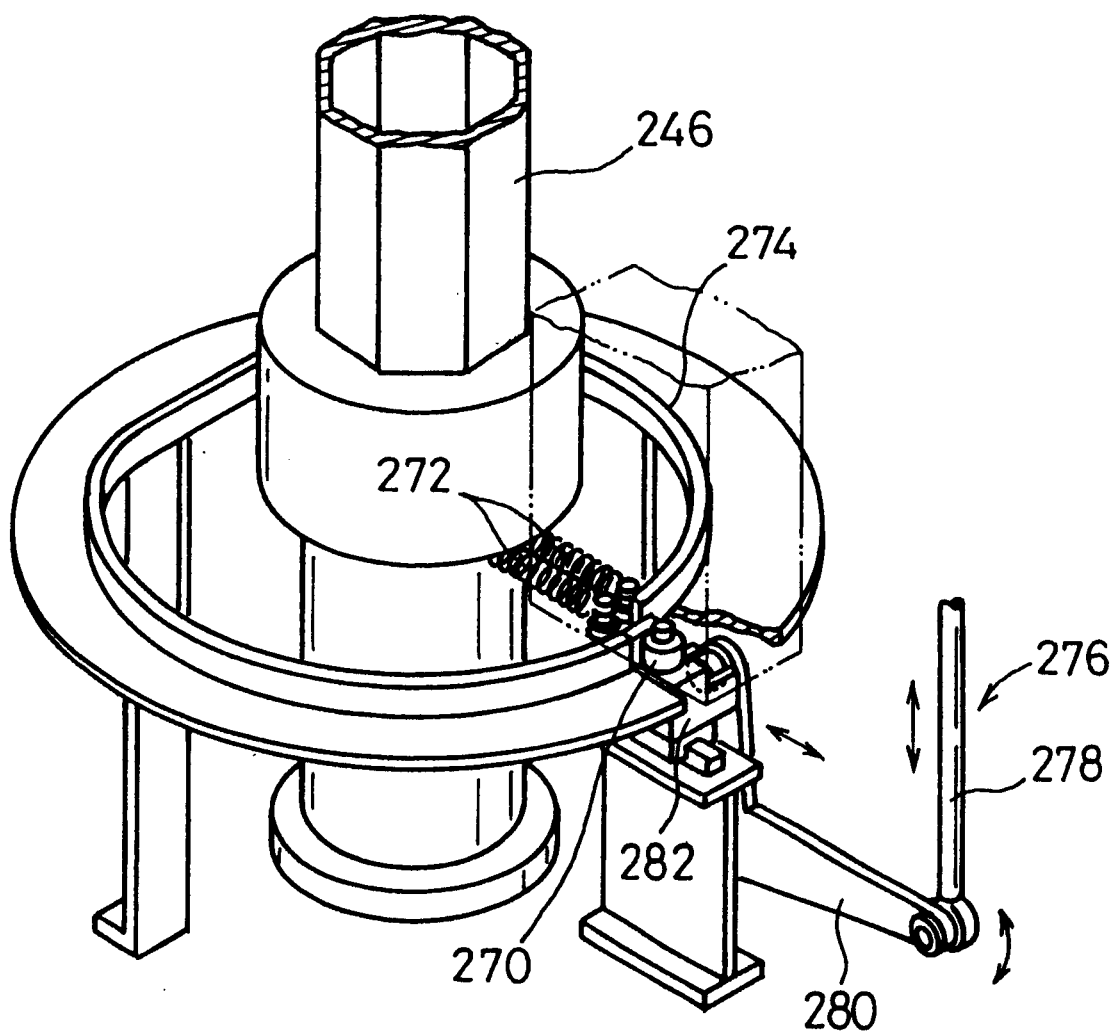
FIG. 16 shows a perspective view illustrating the film-holding section and a cam means.

Link members 258a, 258b, which constitute a driving means 244, are engaged with a side portion of the suction box 254. The link members 258a, 258b are connected integrally by the aid of a connecting rod 260. As shown in FIG. 15, the protruding position in the radial direction of the suction box 254 is determined corresponding to each of the stations. As shown in FIG. 16, a cam member 270, which is provided at a lower portion of the suction box 254, is engaged with a guide member 274 via springs 272 attached to the suction box 254. The both ends of the guide member 274 are separated from each other in the radial direction corresponding to the film-drawing station ST3. The film-drawing station ST3 is provided with a cam means 276 for displacing the suction box 254 outwardly in the radial direction of the index table 24 (in the direction indicated by the arrow C). The cam means 276 is provided with a swinging cam 280 which is swingable by the aid of the driving rod 278. A cam guide 282 for moving the cam member 270 to the both ends of the guide member 274 is provided at the end of the swinging cam 280.

Figure 17:
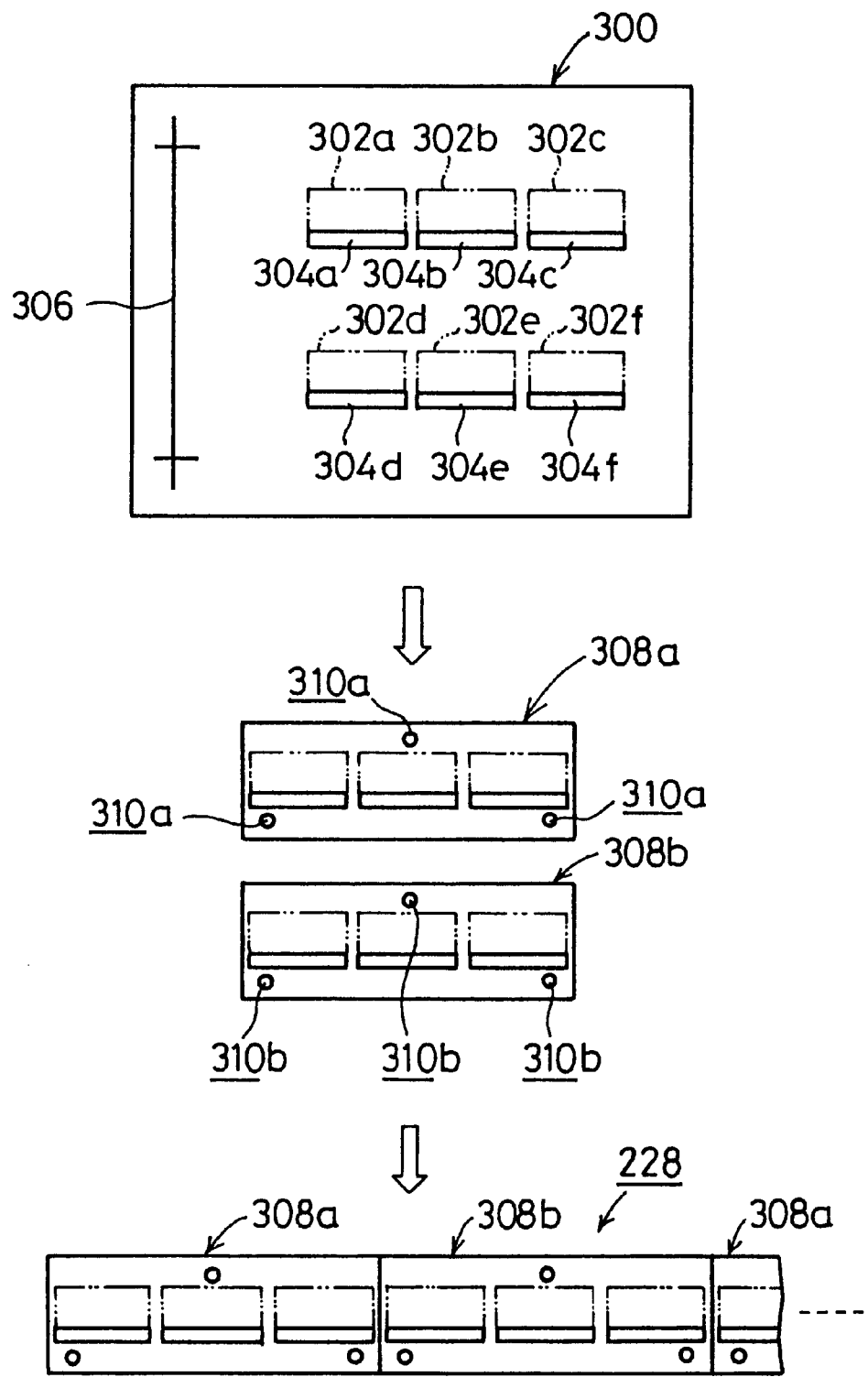
FIG. 17 illustrates the steps of producing an preexposure manuscript.

FIG. 17 schematically shows the steps of preparing the preexposure manuscript 228. At first, preexposure images 304a to 304f and a positioning reference 306 are recorded on a plurality of frames, for example, on six frames 302a to 302f of a sheet manuscript (positive sheet film) 300. The sheet manuscript 300 is cut into two manuscript segments 308a, 308b. Positioning sites 310a, 310b are formed at three places on the manuscript segment 308a, 308b. A predetermined number of sheets of the manuscript segments 308a, 308a are arranged by joining the mutual short sides with each other to construct the manuscript 228. The images 304a to 304f are, for example, character images, and they are set to be patterns which are different from each other.

As shown in FIG. 18, the preexposure apparatus 10 is provided with an image data-preparing mechanism 312 for controlling and converting the manuscript design prepared with digital data into the image data to form the images 304a to 304f on the frames 302a to 302f. The image datapreparing mechanism 312 includes a monitor 317 and a main body unit 316 for charging a recording medium 314 on which the manuscript design is recorded with the digital data. The main body unit 316 is connected to a recording mechanism 318.

Figure 19:
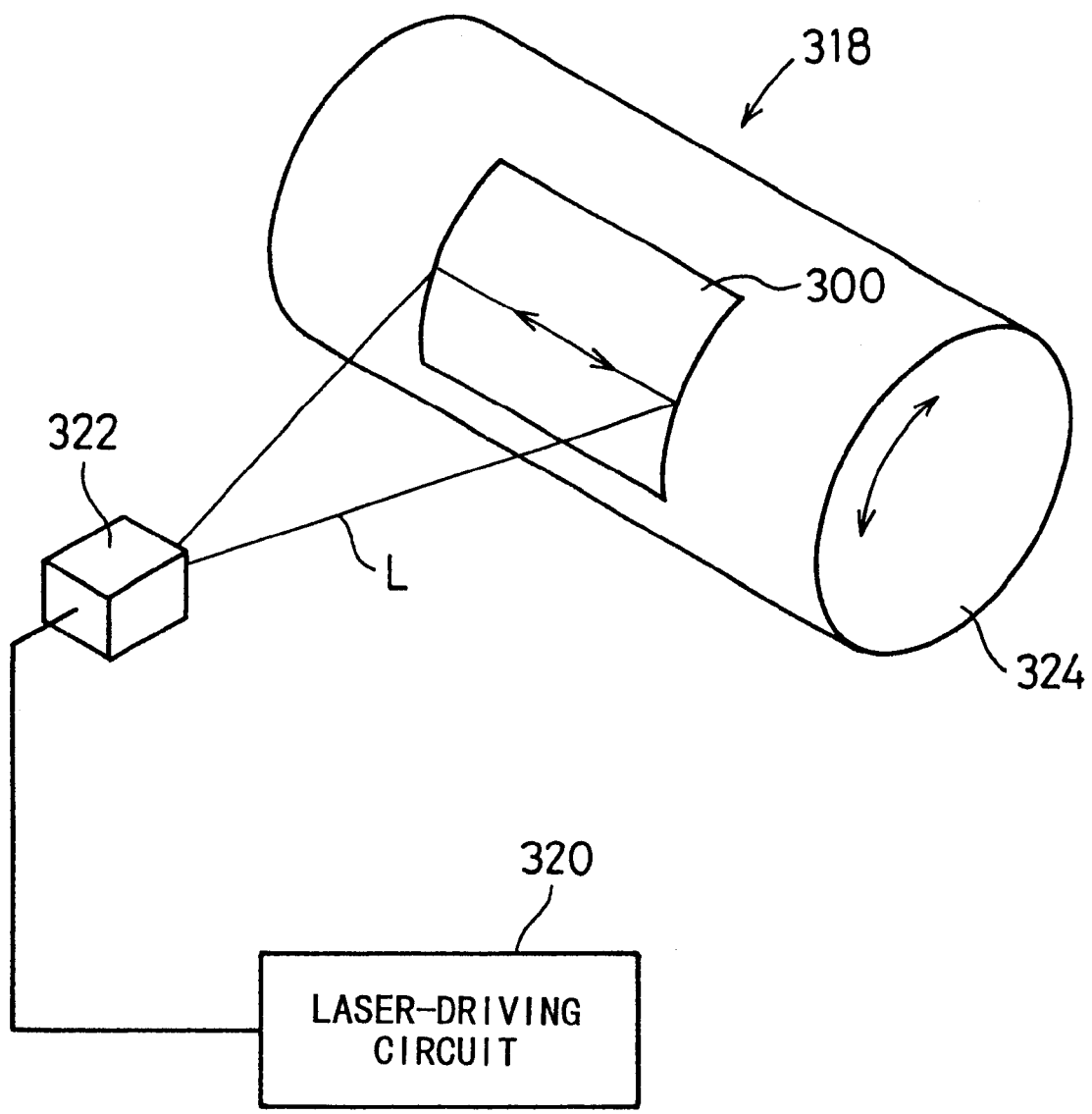
FIG. 19 illustrates a schematic arrangement of the recording mechanism.

The recording mechanism 318 has a function to directly record, on the sheet manuscript 300, the images 304a to 304f and the positioning reference 306. As shown in FIG. 19, the recording mechanism 318 includes a writing laser 322 which is driven and controlled by a laser-driving circuit 320, and a rotary drum 324 which is rotated while attracting and holding the sheet manuscript 300 on the circumferential surface.

Figure 20:
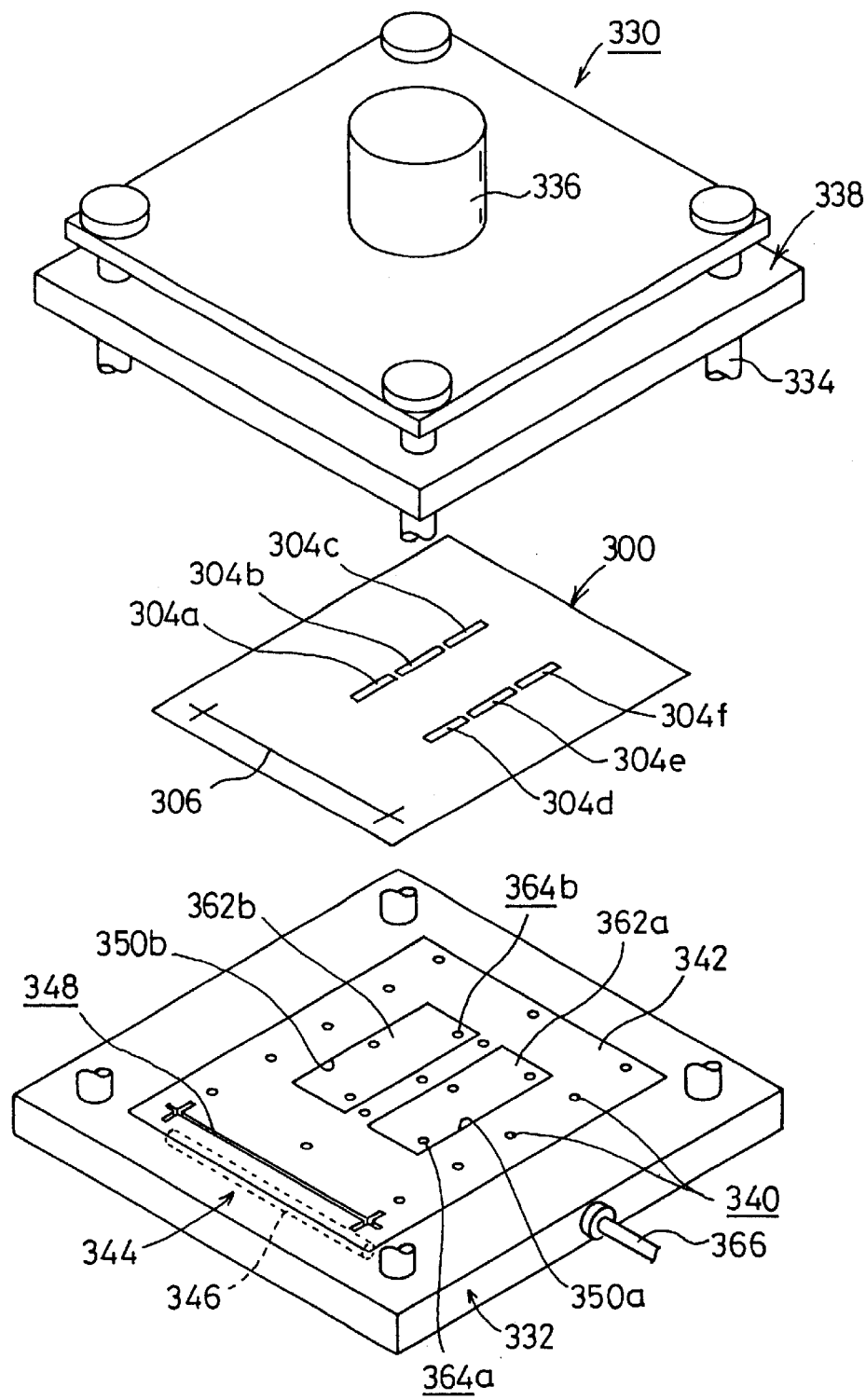
FIG. 20 shows a perspective view illustrating a processing mechanism for cutting a sheet manuscript.
Figure 21:
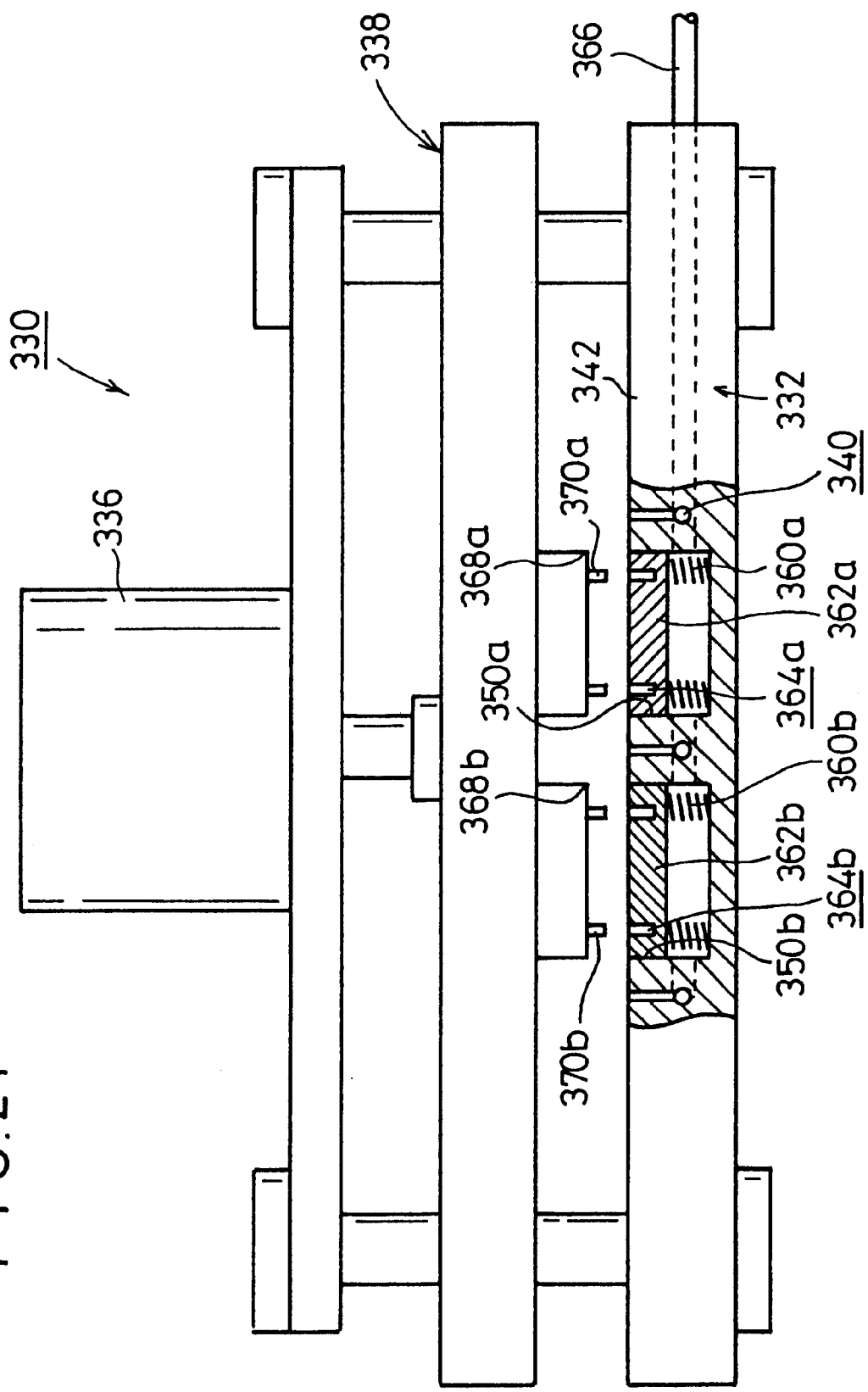
FIG. 21 shows a longitudinal sectional view illustrating the processing mechanism.

As shown in FIGS. 20 and 21, a processing mechanism 330 for cutting the sheet manuscript 300 includes a lower die block 332, and an upper die block 338 which is supported by post guides 334 with respect to the lower die block 332 and which is movable upwardly and downwardly by the aid of a cylinder 336. The lower die block 332 is provided with a placing base 342 which has a plurality of suction holes 340. The placing base 342 is provided with an illumination means 344 corresponding to the positioning reference 306 recorded on the sheet manuscript 300. The illumination means 344 includes a fluorescent lamp 346 which is arranged at the inside of the placing base 342, and a reference slit 348 which is formed through the placing base 342. The reference slit 348 is set to have a widthwise dimension and a length corresponding to the positioning reference 306.

The placing base 342 is provided with lower blades (first blade members) 350a, 350b. The lower blades 350a, 350b have a size corresponding to the dimension of the external shape of the manuscript segment 308a, 308b. Dies 362a, 362b are arranged movably back and forth by the aid of springs 360a, 360b for the lower blades 350a, 350b. The dies 362a, 362b are formed with bores 364a, 364b which correspond to the positioning sites 310a, 310b. The lower die block 332 is provided with a suction hose 366. The suction hose 366 is connected to an unillustrated vacuum source in order to effect the suction from a hole 340.

The upper die block 338 is provided with upper blades (second blade members) 368a, 368b corresponding to the lower blades 350a, 350b, and punches 370a, 370b corresponding to the positioning sites 310a, 310b.

As shown in FIG. 22, the manuscript holder 226 includes a main holder body 372. The main holder body 372 is provided with openings 376 corresponding to a predetermined number of, for example, twenty-five frames, as comparted by partition guides 374. The main holder body 372 is provided with positioning pins 380 which are formed in a zigzag configuration on a flat surface 378 and which are inserted into the positioning sites 310a, 310b provided for the manuscript segments 308a, 308b. The main holder body 372 is provided with screw holes 381. Tapered surfaces 382a, 382b, which are inclined outwardly respectively, are formed at both ends in the short side direction of the flat surface 378.

A presser guide 384 is attached to the main holder body 372. The presser guide 384 has an opening 386 which is lengthy in the direction of arrangement of the manuscript segments 308a, 308b. The presser guide 384 is formed with tapered surface 388a, 388b corresponding to the tapered surfaces 382a, 382b. The presser guide 384 is formed with holes 389. Screws 390 are inserted into the holes 389, and they are screwed into the screw holes 381. Accordingly, the presser guide 384 is fixed to the main holder body 372 while holding the manuscript segments 308a, 308b on the flat surface 378. The main holder body 372 is supported by the aid of a plurality of presser members 392.

Figure 23:
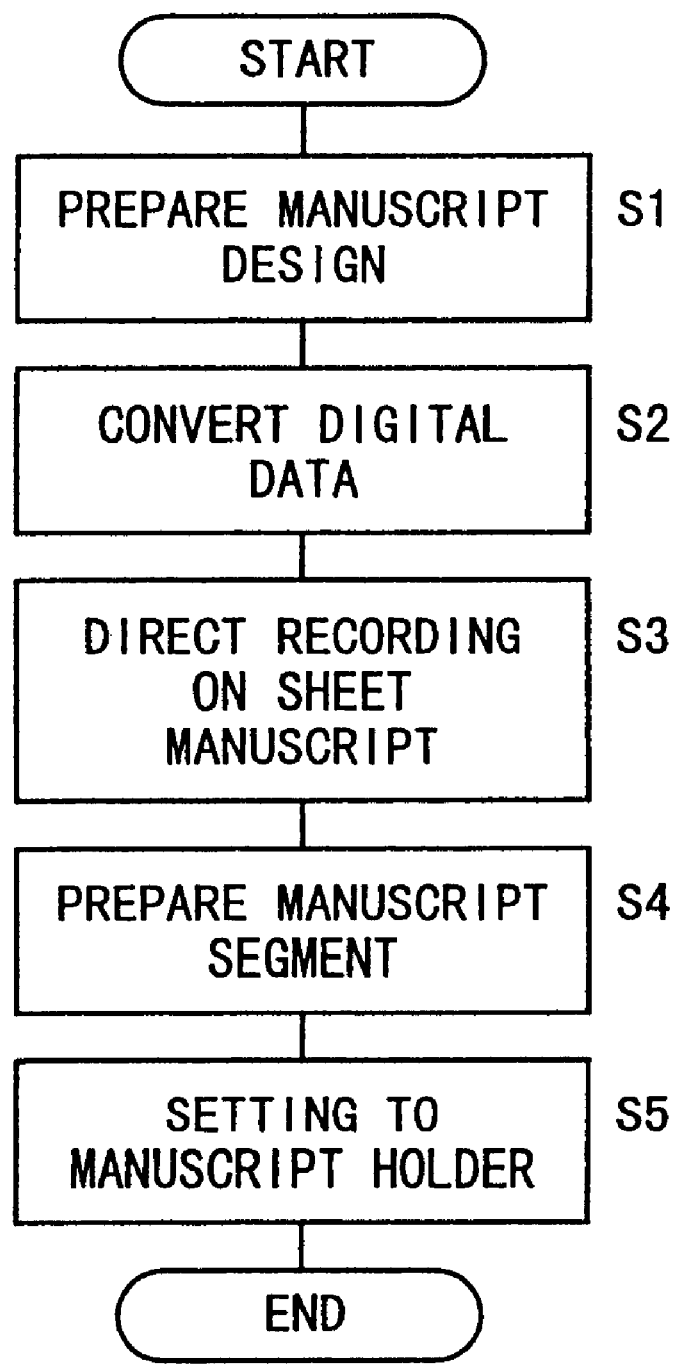
FIG. 23 shows a flow chart for preparation of the preexposure manuscript.

Explanation will be made with reference to a flow chart shown in FIG. 23 firstly for the procedure to prepare the preexposure manuscript 288 with the preexposure apparatus 10 constructed as described above.

A desired manuscript design is prepared (step S1), and the manuscript design is recorded as digital data on the recording medium 314. After that, the recording medium 314 is charged to the main body unit 316 which constitutes the image data-preparing mechanism 312 (see FIG. 18). In the image data-preparing mechanism 312, the digital data of the manuscript design, which is recorded on the recording medium 314, is converted into the image data to prepare manuscript-preparing data of, for example, six frames in total comprising upper and lower sets of three frames (step S2). The manuscript-preparing data is fed from the main body unit 316 to the recording mechanism 318 to be directly recorded on the sheet manuscript (step S3).

In the recording mechanism 318, as shown in FIG. 19, the sheet manuscript 300 is held on the rotary drum 324, and the rotary drum 324 is rotated. On the other hand, the laser 322, which is driven and controlled by the laser-driving circuit 320, radiates a laser beam L in a direction substantially perpendicular to the direction of rotation of the rotary drum 324. Accordingly, the images 304a to 304f are directly recorded on the sheet manuscript 300 corresponding to the respective frames 302a to 302f, and the positioning reference 306 is also recorded on the sheet manuscript 300.

Subsequently, after the sheet manuscript 300 is subjected to a development treatment, the routine proceeds to the step S4 to prepare manuscript segments 308a, 308b from the sheet manuscript 300. As shown in FIGS. 20 and 21, when the sheet manuscript 300 is arranged on the placing base 342 which constitutes the processing mechanism 330, the sheet manuscript 300 is attracted and held on the placing base 342 as effected from the suction hose 366 via the hole 340. When the fluorescent lamp 346, which constitutes the illumination means 344, is turned on, the illumination light beam is radiated from the reference slit 348 onto the sheet manuscript 300.

Subsequently, the positioning reference 306 of the sheet manuscript 300 is allowed to coincide with the illumination light beam radiated from the reference slit 348 to position the sheet manuscript 300 on the placing base 342. After that, the upper die block 338 is moved downwardly in accordance with the driving action of the cylinder 336. Accordingly, at first, the positioning sites 310a, 310b are bored through the sheet manuscript 300 by the aid of the punches 370a, 370b and the bores 364a, 364b of the dies 362a, 362b. After that, the trimming processing is applied by means of the upper blades 368a, 368b and the lower blades 350a, 350b, and the manuscript segments 308a, 308b are cut.

A number of the manuscript segments 308a, 308b corresponding to a desired number of frames are aligned by the aid of the manuscript holder 226 (step S5). As shown in FIG. 22, the positioning pins 380, which are provided for the main holder body 372, are inserted into the positioning sites 310a, 310b of the manuscript segments 308a, 308b. In this state, the manuscript segments 308a, 308b are aligned on the flat surface 378. The presser guide 384 is arranged on the main holder body 372 while allowing the tapered surfaces 388a, 388b to make contact with the tapered surfaces 382a, 382b. The presser guide 384 is fixed to the main holder body 372 by the aid of the screws 390 in a state in which the respective manuscript segments 308a, 308b are held.

As described above, in the first embodiment, when the manuscript 228 is prepared, the manuscript design is firstly prepared with the digital data. The digital image data is fed from the image data-preparing mechanism 312 to the recording mechanism 318. The manuscript design is directly recorded on the sheet manuscript 300. Accordingly, the following effect is obtained. That is, it is possible to efficiently prepare the highly pure images 304a to 304f. Further, it is easy to realize the efficient and quick operation for preparing the manuscript 228 as a whole. Furthermore, it is easy to prepare the images 304a to 304f which have patterns different from each other.

Further, the images 304a to 304f and the positioning reference 306 are directly recorded on the sheet manuscript 300 by the aid of the recording mechanism 318. Accordingly, even when the positions of the images 304a to 304f are varied with respect to the external shape of the sheet manuscript 300, the images 304a to 304f and the positioning reference 306 are always positioned highly accurately. Therefore, when the cutting operation is performed in the processing mechanism 330 in the state in which the positioning reference 306 is positioned by the aid of the illumination means 344, the images 304a to 304f are reliably arranged at the desired positions on the manuscript segments 308a, 308b. Accordingly, the highly accurate manuscript 228 can be reliably obtained by aligning the manuscript segments 308a, 308b on the manuscript holder 226.

Next, the operation of the preexposure apparatus 10 will be explained below.

At first, as shown in FIG. 1, a plurality of film cartridges 14, in each of which the film 12 in the unexposed state is wound and accommodated, are supplied to the film supply section 16. The film cartridges 14 are taken out of the film supply section 16, and they are transported to the supply conveyer 18. The supply conveyer 18 successively transports the respective film cartridges 14 to the index table 24. The film cartridge 14, which is disposed at the forward end position, is transported to the cartridge attitude-changing means 38.

That is, as shown in FIG. 3, the first shutter means 34 is opened, and the film cartridge 14 is placed on the placing section 48 which constitutes the cartridge attitude-changing means 38. As shown in FIGS. 4 and 5, the film cartridge 14 is placed on the placing section 48 with the opening 14a being directed in the horizontal direction. The film cartridge 14 is gripped by the gripping members 52a, 52b at its both end surfaces in accordance with the action of the air chuck 50.

Subsequently, the motor 44 is driven to swing the swingable stand 42 integrally with the rotary shaft 46. Accordingly, the film cartridge 14, which is held on the placing section 48, is subjected to the attitude transformation with the opening 14a directed downwardly (see FIG. 6). After the attitude of the film cartridge 14 is transformed, the second shutter means 36 is opened while the first shutter means 34 is closed. The film cartridge 14 is fed to the holding means 20 which is arranged in the film supply station ST1.

As shown in FIGS. 7 and 8, in the holding means 20, the spindle 102 and the movable pressing member 62 wait beforehand at the positions separated from the placing stand 60. The film cartridge 14 is placed on the placing stand 60. It is noted that the film cartridge 14 has been subjected to the attitude transformation by the cartridge attitude-changing means 38 so that the opening 14a is directed downwardly. The film cartridge 14 is placed on the placing stand 60 while maintaining the attitude.

When the unillustrated driving cam, which has been engaged with the cam roller 74, is separated from the cam roller 74, the movable pressing member 62 presses the side surface of the film cartridge 14 placed on the placing stand 60, by the aid of the resilient force of the springs 70a, 70b. Accordingly, the film cartridge 14 is positioned and supported by the aid of the placing stand 60 and the pressing surface 64 (see FIG. 8).

As shown in FIG. 2A, in the film supply station ST1, the rotary pin 132, which constitutes the lid-opening means 130, is engaged with the rotary shaft 14c of the film cartridge 14 positioned and held by the holding means 20. The rotary shaft 14c is unlocked to make rotation by a predetermined angle in the direction of the arrow B thereafter. Therefore, the lid 14b, which is provided integrally with the rotary shaft 14c, makes swinging movement, and the opening 14a of the film cartridge 14 is opened.

When the lid 14b is opened, the lid-opening means 130 is separated from the film cartridge 14. Further, the index table 24 is rotated in the direction of the arrow in FIG. 3 by a predetermined angle, for example, by 45 degrees. Accordingly, the film cartridge 14, which is held by the holding means 20, is arranged at the film forward end-protruding station ST2. In the film forward end-protruding station ST2, the rotary pin 104, which is installed to the forward end of the spindle 102, is engaged with the rewinding shaft 14d of the film cartridge 14. The rewinding shaft 14d is rotated by the aid of the forward end-protruding means 140.

That is, as shown in FIG. 7, the slide table 98 is moved toward the placing stand 60 (in the direction of the arrow A) by the aid of the cam means 118. The rotary pin 104, which is provided at the forward end of the spindle 102, is engaged with the rewinding shaft 14d of the film cartridge 14. On the other hand, as shown in FIG. 9, the forward end-protruding means 140, which is arranged in the film forward end-protruding station ST2, is operated as follows. That is, the cam rod 154 is moved in the vertical direction, and thus the swinging arm 152, which constitutes the cam means 150, swings its forward end in the horizontal direction. The movable stand 146 engaged thereto is displaced in the direction of the arrow D in accordance with the guiding action of the rails 148a, 148b.

Subsequently, the rotary cam 160 is rotated about the vertical axis in a state in which the clutch member 170 is arranged coaxially with the clutch member 106 which constitutes the rotating means 94. The swinging arm 162, which is secured to the rotary cam 160, makes swinging movement in the horizontal direction. Accordingly, the sliding member 158 is displaced toward the rotating means 94 by being guided by the horizontal guide plate 156. The clutch member 170 is meshed with the clutch member 106. The clutch members 170, 106 are pressed and supported with each other by the aid of the resilient force of the spring 172.

As shown in FIGS. 7 and 8, the cam means 92a, 92b are pressed, and the rods 86a, 86b are moved in the directions to make separation from each other. The rollers 82a, 82b, which are provided on the brackets 84a, 84b, are separated from each other, and a gap is formed therebetween. Similarly, the pair of interposing plates 83a, 82b are held at the positions separated from each other by driving the cam means 93a, 93b.

The sliding member 112 is separated from the circumferential surface of the spindle 102 by the aid of the cam means 108. The motor 164, which constitutes the forward end-protruding means 140, is driven. Accordingly, as shown in FIG. 9, the driving shaft 168 is rotated by the aid of the belt-pulley means 166. The rotary pin 104, which is provided at the forward end of the spindle 102, is rotated in the direction of the arrow E as shown in FIG. 2B in accordance with the action of rotation of the clutch member 170 provided on the driving shaft 168 and the clutch member 106 meshed with the clutch member 170. The rotary pin 104 rotates the rewinding shaft 14d in the direction of the arrow E. The forward end of the film 12 wound around the rewinding shaft 14d is rewound through the opening 14a by a predetermined length.

Further, the driving of the motor 164 is stopped, and the cam means 108 is released. The sliding member 112 abuts against the circumferential surface of the spindle 102 by the aid of the resilient force of the spring 114 to stop the rotation of the spindle 102. On the other hand, when the pressing action of the cam means 92a, 92b, 93a, 93b is released, the forward end of the film 12 drawn from the film cartridge 14 is gripped by the aid of the rollers 82a, 82b and the interposing plates 83a, 83b.

After the forward end of the film 12 is drawn by a predetermined length from the film cartridge 14, the index table 24 is rotated by 45 degrees in the direction of the arrow as shown in FIG. 3. The film cartridge 14, from which the forward end of the film 12 has been drawn, is arranged at the film-drawing station ST3. In the film-drawing station ST3, the pressing force is released from the cam means 118. Therefore, the rotary pin 104 is separated from the film cartridge 14 integrally with the spindle 102.

On the other hand, as shown in FIG. 10, the drawing means 180 is operated as follows. That is, when the cam means 190 is driven, the main body 186 is rotated about the support point of the support shaft 182 by the aid of the cam rod 188 in accordance with the swinging action of the arm member 192. The air chuck 208 is arranged corresponding to the forward end of the film 12 drawn under the placing stand 60. Subsequently, when the air chuck 208 is driven, and the forward end of the film 12 is gripped by the gripping members 210a, 210b, then the cam means 92a, 92b, 93a, 93b are driven, and the gripping action for the film 12 by the rollers 82a, 82b and the interposing plates 83a, 83b are released. After that, the motor 200 is driven.

Accordingly, the endless belt 196, which is stretched between the pulley 198b and the pulley 198a secured to the driving shaft 202, travels in a circumscribing manner. The air chuck 208 is moved downwardly in the vertical direction integrally with the elevator stand 204 by the aid of the connecting member 206 which is fixed to the endless belt 196. The air chuck 208 grips the forward end of the film 12. The air chuck 208 is moved downwardly by a distance corresponding to the entire length of the film 12. Accordingly, the entire length of the film 12 is automatically drawn from the film cartridge 14 downwardly in the vertical direction.

When the entire length of the film 12 is drawn downwardly in the vertical direction by the aid of the drawing means 180, the swinging cam 280 makes swinging movement by the aid of the driving rod 278 which constitutes the cam means 276 as shown in FIG. 16. The suction box 254, which constitutes the suction means 242, is moved outwardly in the radial direction (in the direction of the arrow C) of the index table 24 by the aid of the cam guide 282. Therefore, the suction box 254 is arranged corresponding to the surface on the side opposite to the emulsion surface (exposure surface) of the film 12 drawn over its entire length. When the suction is effected through the suction ports 256 in accordance with the action of the unillustrated vacuum source, the suction box 254 attracts and holds the entire length of the film 12.

In the drawing means 180, the gripping of the film 12 by the air chuck 208 is released, and then the cam means 190 is driven to swing the main body 186 about the support point of the support shaft 182 in accordance with the swinging action of the arm member 192. The main body 186 is separated from the film 12. Further, the index table 24 is rotated by 45 degrees in the direction of the arrow as shown in FIG. 3. The film cartridge 14, from which the entire length of the film 12 is drawn, is arranged in the positioning station ST4.

In the positioning station ST4, the positioning is previously performed for the film 12 in the widthwise direction and in the height direction corresponding to the photographing position. The positioning in the widthwise direction may be performed by regulating the film edge with unillustrated positioning pins. The positioning in the longitudinal direction may be performed, for example, by adopting the same driving means as the forward end-protruding means 140 to rotate the rewinding shaft 14d in a predetermined direction. The film 12, which has been positioned in the positioning station ST4, is arranged in the exposure station ST5 integrally with the film cartridge 14 in accordance with the action of rotation of the index table 24.

In the exposure station ST5, as shown in FIGS. 11 and 12, the main exposure unit 216 is moved inwardly in the radial direction of the index table 24 (in the direction of the arrow F) along the rails 214 in accordance with the action of the cam means 218a, 218b. The main exposure unit 216 is positioned on the side of the emulsion surface of the film 12 which is attracted and held by the film-holding section 240.

Accordingly, as shown in FIG. 13, when the illumination light beam is radiated by the conduction light 224 by the aid of the fiber 222 in accordance with the action of the unillustrated light source, the image of the manuscript 228, which is held in the main exposure unit 216 by the aid of the manuscript holder 226 and the lid member 226a, is focused by the respective lenses 230 onto the respective frames of the film 12.

During this process, the light is radiated onto the film 12 via the respective exposure windows 234 which are provided for the aperture 232. Therefore, the respective frames of the film 12 are simultaneously preexposed, for example, with the image such as a character carried on the manuscript 228 at the predetermined position over the predetermined range. After completing the preexposure process effected by the exposure section 32, the main exposure unit 216 is separated from the film 12, and the index table 24 is rotated by 45 degrees in the direction of the arrow as shown in FIG. 3. The film 12 after the preexposure is arranged in the winding station ST6.

In the winding station ST6, although not shown, the driving means similar to the forward end-protruding means 14 is used to rotate the rewinding shaft 14d. Accordingly, the film 12 is wound around the rewinding shaft 14d. Further, the index table 24 is rotated by 45 degrees in the direction of the arrow as shown in FIG. 3. The film cartridge 14, in which the film 12 has been rewound, is arranged in the positioning station ST7. The unillustrated state indicator of the film cartridge 14 is aligned at the predetermined position.

After that, the index table 24 is rotated by 45 degrees in the direction of the arrow as shown in FIG. 3. The film cartridge 14 is released from the positioning station ST7, and it is arranged in the withdrawing station ST8. Subsequently, the lid 14b is closed by the aid of the lid-closing means 238 to close the opening 14a (see FIG. 2D). The film cartridge 14 after closing the lid is released from the holding means 20, and it is once arranged in the cartridge attitude-changing means 38, while opening the second shutter means 36.

In the cartridge attitude-changing means 38, the film cartridge 14 is held at the attitude in which the opening 14a is directed downwardly as shown in FIG. 6. Starting from this state, the swingable stand 42 makes swinging movement in accordance with the driving action of the motor 44, and thus the film cartridge 14 is subjected to the attitude transformation to obtain the attitude in which the opening 14a is directed in the horizontal direction (see FIG. 5). Further, the first shutter means 34 is opened while the second shutter means 36 is closed. The film cartridge 14 is transported from the cartridge attitude-changing means 38 to the withdrawing conveyer 26. The withdrawing conveyer 26 successively transports, to the film-stacking section 28, the film cartridge 14 containing the film 12 after the preexposure wound therein. The film cartridges 14 are aligned and stacked in the film-stacking section 28.

In the first embodiment of the present invention, the film cartridge 14 is held by each of the holding means 20 provided for the index table 24 which is rotated intermittently in the darkroom 22, and then the film cartridge 14 is successively transported to the film supply station ST1, the film forward end-protruding station ST2, the film-drawing station ST3, the positioning station ST4, the exposure station ST5, the winding station ST6, the positioning station ST7, and the withdrawing station ST8. The preexposure process is performed in accordance with the divided operations. Accordingly, the following effect is obtained. That is, it is easy to perform, at a high speed, the preexposure operation to be applied to the predetermined portion of the film 12 wound and accommodated in each of the film cartridges 14. Therefore, the process of the present invention is suitable for mass production.

Further, the entire length of the film 12 is drawn downwardly in the vertical direction from the film cartridge 14 in the film-drawing station ST3. After that, the entire length of the film 12 is simultaneously exposed with the desired image in accordance with the action of the exposure section 32 in the state in which the entire length of the film 12 is attracted and held by the film-holding section 240. Accordingly, the preexposure operation for the film 12 is quickly performed all at once with ease. It is possible to obtain the efficiency of the entire preexposure operation.

In the exposure section 32, the manuscript 228 is held by the manuscript holder 226. The aperture 232 is formed with the exposure windows 234 corresponding to the respective frames of the film 12. Therefore, when the position is adjusted for the manuscript 228 and the aperture 232, it is possible to change the position of the pattern in the preexposure area without deteriorating the accuracy of the preexposure area of the film 12. Further, an arbitrary frame of the film 12 can be exposed, and all of the screen can be exposed only by setting the shape and the position of the exposure window 234. It is advantageous that the variation of the preexposure process is increased.

In the first embodiment of the present invention, the main exposure unit 216, which constitutes the exposure section 32, is designed to have the long size in the vertical direction corresponding to the entire length of the film 12, and the plurality of lenses 230 are arranged corresponding to all of the frames of the film 12. However, the main exposure unit 216 may be designed to have a short size, and the main exposure unit 216 may be moved upwardly and downwardly to apply the preexposure process by a predetermined number of times to the respective exposure surfaces of the film 12, because of the following reason. That is, especially when the film 12 has a long size, it is feared that the conduction light 224 has a considerably long size, and it is difficult to obtain uniform illumination light.

The first embodiment of the present invention has been explained by using the film cartridge 14 for accommodating the APS film. However, the present invention is also applicable when the preexposure is performed, for example, for a film such as 35 mm film (135 film) accommodated in ordinary Patrone.

The first embodiment of the present invention is designed such that the entire length of the film 12 is automatically drawn from the film cartridge 14 in the vertical direction. However, another design is also available, in which the film 12 is drawn horizontally or obliquely.

Figure 24:
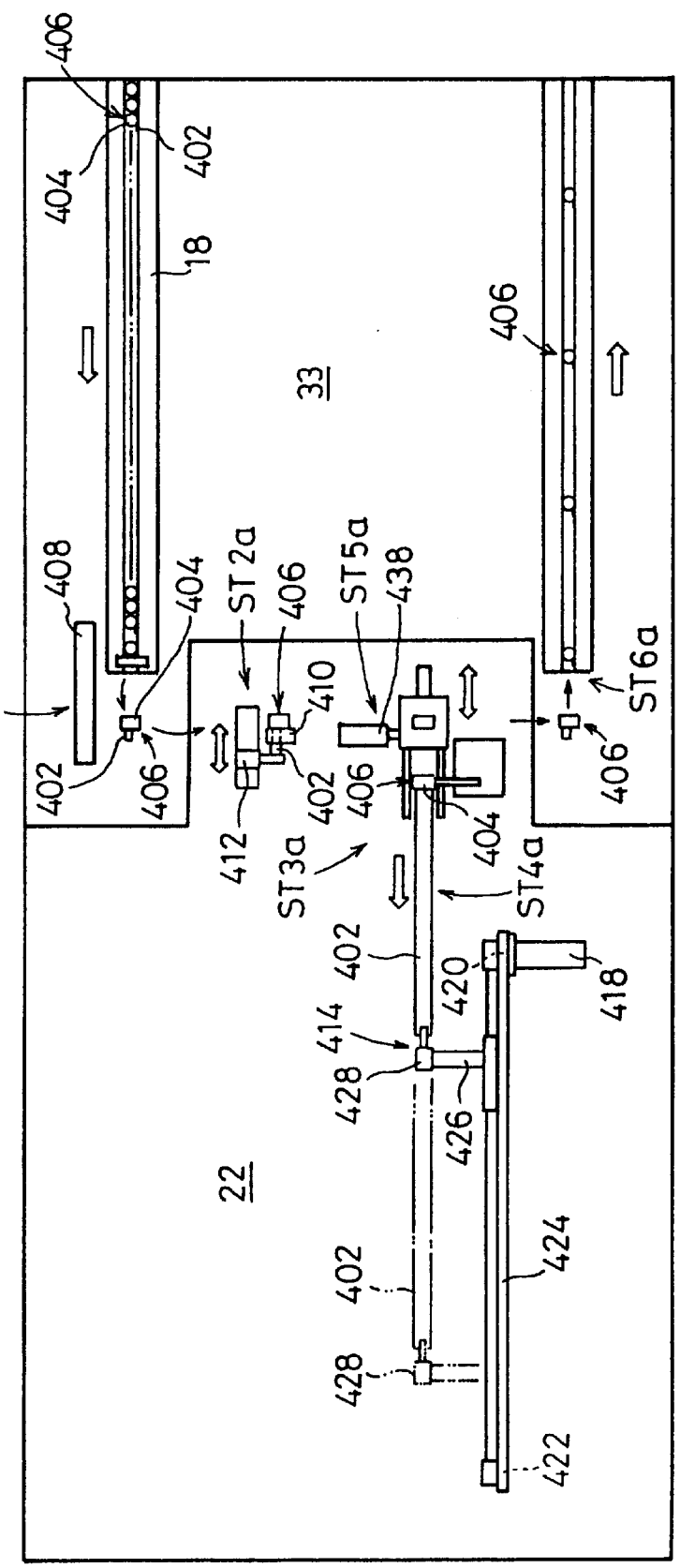
FIG. 24 shows a schematic plan view illustrating a preexposure apparatus according to a second embodiment of the present invention.
Figure 25:
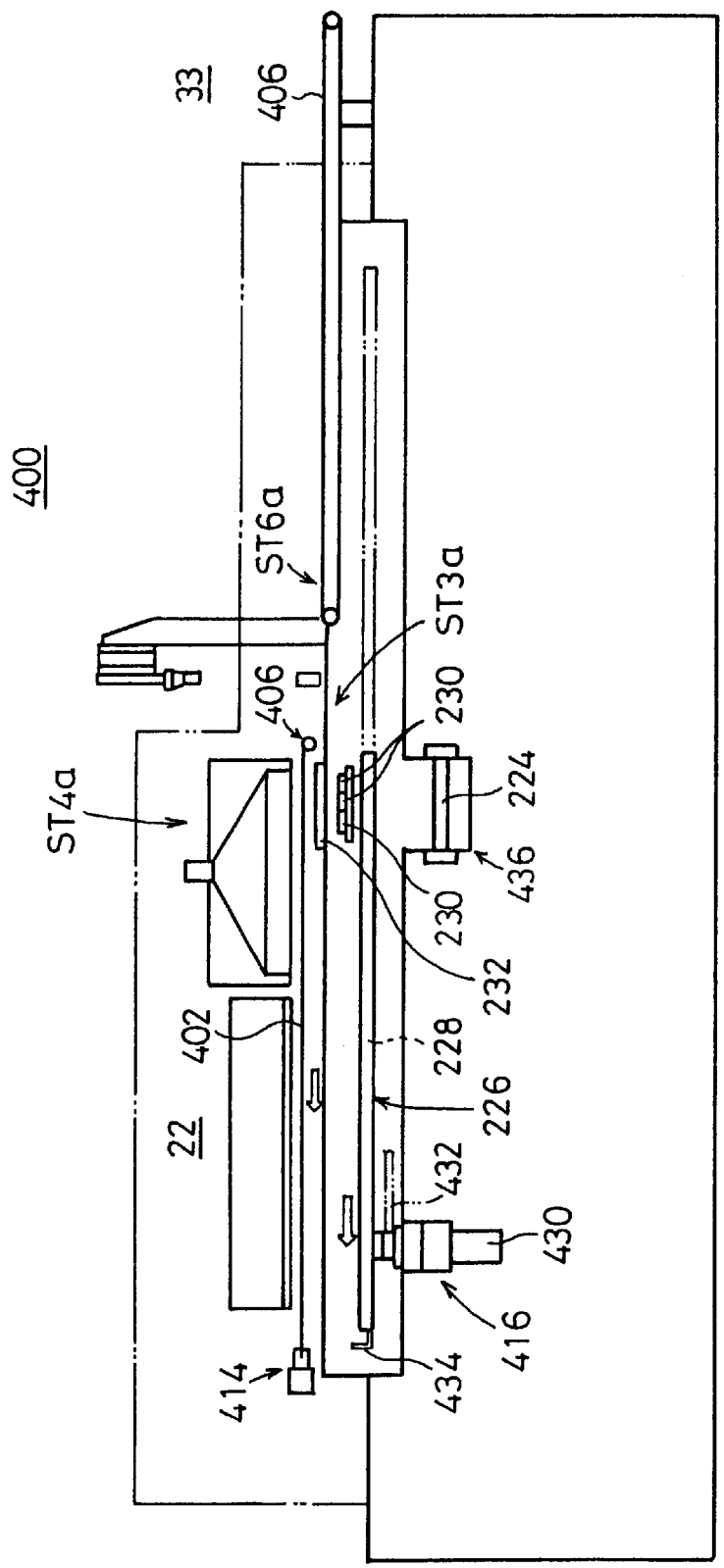
FIG. 25 shows a schematic side view illustrating the preexposure apparatus.

FIG. 24 shows a schematic plan view illustrating a preexposure apparatus 400 for carrying out a preexposure method for photosensitive films according to a second embodiment of the present invention. FIG. 25 shows a schematic side view illustrating the preexposure apparatus 400. The same constitutive components as those of the preexposure apparatus 10 according to the first embodiment described above are designated by the same reference numerals, detailed explanation of which will be omitted.

The preexposure apparatus 400 comprises a supply conveyer 18 for transporting a Patrone film 406 in a standing attitude in which an unexposed film 402 such as 35 mm film is wound and accommodated in a Patrone 404, a film supply station ST1a for changing the attitude of the Patrone film 404 at the forward end side of the supply conveyer 18 and supplying the Patrone film 406 from a lighted room 33 into a darkroom 22, a film forward end-protruding station ST2a for always drawing a constant length of the forward end of the film 402 from the Patrone film 406, a film-drawing station ST3a for automatically drawing the film 402 in an amount of a predetermined number of frames, for example, three frames in the horizontal direction from the Patrone film 406, an exposure station ST4a for performing exposure for every three frames of the film 402 drawn in the amount of three frames, a winding station ST5a for automatically rewinding the film 402 after the exposure into the Patrone film 406, and a withdrawing station ST6a for withdrawing the Patrone film 406 from the darkroom 22 to the lighted room 33. A pick-up robot 408 for automatically transporting the Patrone film 406 is arranged therebetween.

The film forward end-protruding station ST2a is provided with a holding means 410 for holding the Patrone film 406 in a state in which the film 402 is maintained in a horizontal attitude. A tip-protruding means 412 is provided, which is used to draw the film 402 up to a certain length from the Patrone film 406 held by the holding means 410. The tip-protruding means 412 is constructed in the same manner as the drawing means 180 used in the first embodiment.

The film-drawing station ST3a is provided with the holding means 410 for holding the Patrone film 406, a film-drawing means 414 for successively drawing the three frames of the film 402, a suction means 242 for attracting and holding the film 402, and a holder-moving means 416 for moving a manuscript holder 226 in which a manuscript 228 is accommodated and held, in synchronization with the drawing means 414.

The drawing means 414 is provided with a servo motor 418. A timing belt 424 is stretched between a pulley 420 which is connected to the servo motor 418 and a pulley 422 which is arranged while being separated from the pulley 420 by a predetermined distance in the drawing direction for the film 402. A first end of a connecting member 426 is fixed to the timing belt 424. A chuck section 428 for gripping the forward end of the film 402 is installed to a second end of the connecting member 426. For example, the chuck section 428 is constructed in the same manner as the air chuck 208 according to the first embodiment.

The holder-moving means 416 is provided with a servo motor 430. A manuscript holder 226 is connected to a belt/pulley means 432 which is connected to the servo motor 430. The manuscript holder 226 is movable back and forth along a guide 434 which extends in the drawing direction for the film 402.

Figure 26:
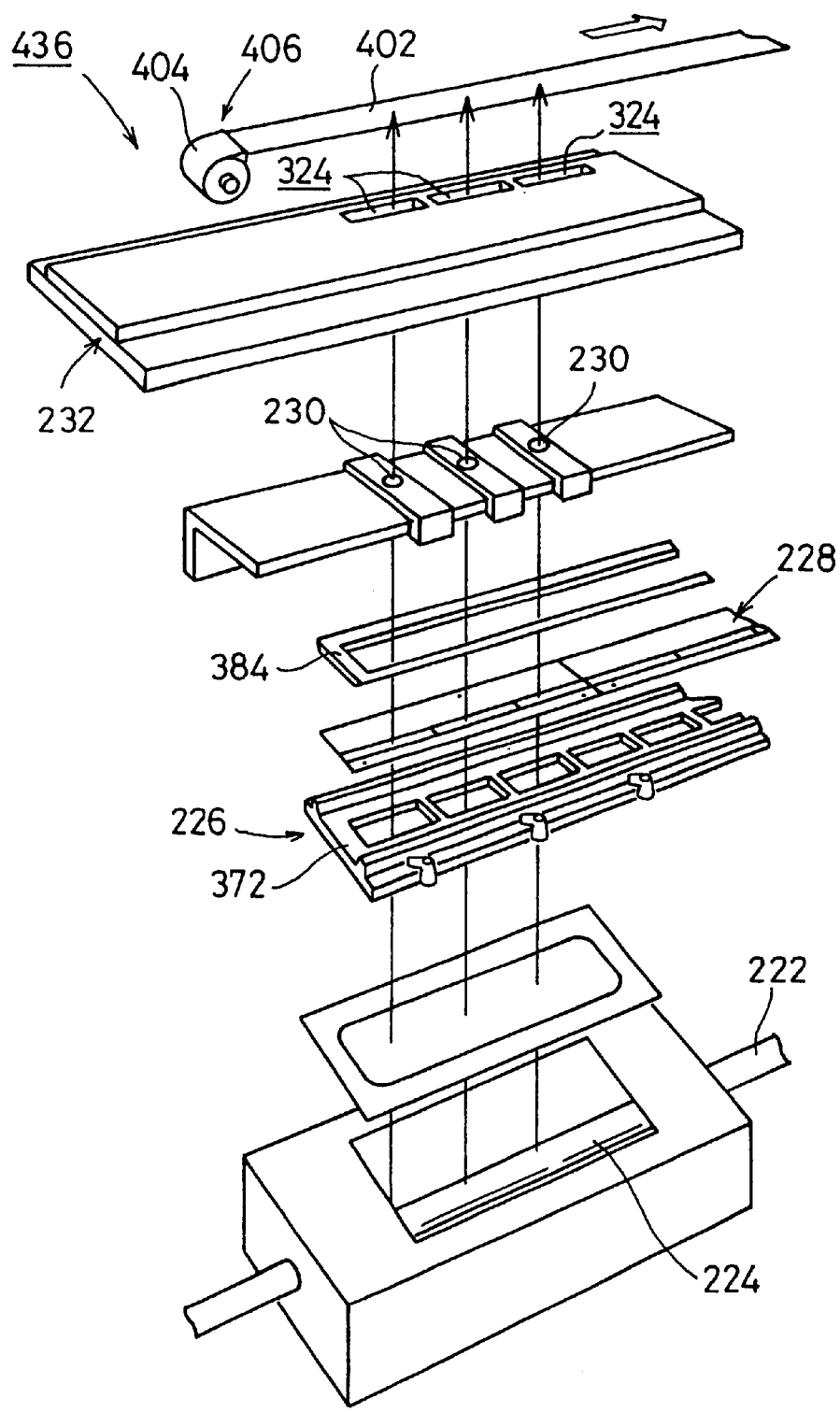
FIG. 26 shows an exploded perspective view illustrating an exposure section which constitutes the preexposure apparatus.

As shown in FIG. 26, an exposure section 436 is arranged for the exposure station ST4a. The exposure section 436 is constructed substantially in the same manner as the exposure section 32 of the first embodiment, including three lenses 230 which are arranged in the horizontal direction in order to perform exposure for the three frames of the film 402. An aperture 232 is formed with three exposure windows 234 which are arranged in the horizontal direction corresponding to the three frames in the same manner as the lenses 230. A servo motor 438 is arranged for the winding station ST5a.

The operation of the preexposure apparatus 400 according to the second embodiment constructed as described above will be explained below.

At first, the preexposure manuscript 228 is formed in the same manner as in the first embodiment. The manuscript 228 is set in the manuscript holder 226. When the Patrone film 406 is introduced in the standing attitude into the supply conveyer 18, then the Patrone film 406 is transported by the aid of the supply conveyer 18, it is gripped by the pick-up robot 408, and it is supplied to the film supply station ST1a. During this process, the attitude of the Patrone film 406 is converted from the standing attitude to the horizontal attitude.

The Patrone film 406 is transported to the film forward end-protruding station ST2a. The tip-protruding means 412 is driven in a state in which the Patrone film 406 is held by the holding means 410. The film 402 is drawn until a constant length is given. Accordingly, the constant length of the film can be always drawn irrelevant to the dispersion of the tip length of the film 402 which protrudes beforehand. In this state, the Patrone film 406 is transported to the film-drawing station ST3a.

In the film-drawing station ST3a, the Patrone film 406 is held by the holding means 410. The forward end is gripped by the chuck section 428 which constitutes the drawing means 414. Subsequently, the servo motor 418 is driven so that the chuck section 428 draws the film 402 in the amount corresponding to the three frames by the aid of the pulleys 420, 422 and the timing belt 424. On the other hand, the manuscript holder 226 is moved in the amount of three frames corresponding to the film 402 in accordance with the driving action of the servo motor 430 which constitutes the holder-moving means 416.

The surface of the film 402, which is disposed on the side opposite to the exposure surface of the film 402, is attracted and held by the suction means 242. In this state, the illumination light beam is radiated onto the conduction light 224 in accordance with the unillustrated light source. Accordingly, the images, which correspond to the three frames of the manuscript 228 held by the manuscript holder 226, are focused on the three frames of the film 402 by the aid of the lenses 230. Thus, the preexposure is performed.

When the preexposure is performed for the three frames of the film 402, the drawing means 414 and the holder-moving means 416 are synchronously driven. The film 402 is drawn in an amount corresponding to further three frames. On the other hand, the manuscript 228 held by the manuscript holder 226 is moved in the amount corresponding to the three frames. In this state, the preexposure is performed for the three frames of the film 402 by the aid of the exposure section 436. The drawing and the exposure of the film 402 are performed nine times as described above. Accordingly, the film 402 is subjected to the preexposure treatment for the twenty-seven frames.

The film 402 after completion of the preexposure Is wound into the Patrone 404 in accordance with the action of rotation of the servo motor 438 which is arranged for the winding station ST5a. The Patrone film 406 is withdrawn from the withdrawing station ST6a to the withdrawing conveyer 26.

As described above, in the second embodiment, the film 402 is drawn for even predetermined number of frames, for example, for every three frames. The preexposure treatment is performed by the exposure section 436 corresponding to the amount of three frames. After that, the film 402 is drawn in the amount corresponding to further three frames by the aid of the drawing means 414. The preexposure is performed for the new three frame. Therefore, it is unnecessary to arrange a large number of lenses 230 especially for the film 402 having a large number of frames. Further, the conduction light 224 does not have a lengthy size. Therefore, an effect is obtained that the equipment cost can be effectively reduced. Further, it is easy to respond to various films 402 having a different number of frames, which is advantageous in that the system is excellent in versatility.

Figure 27:
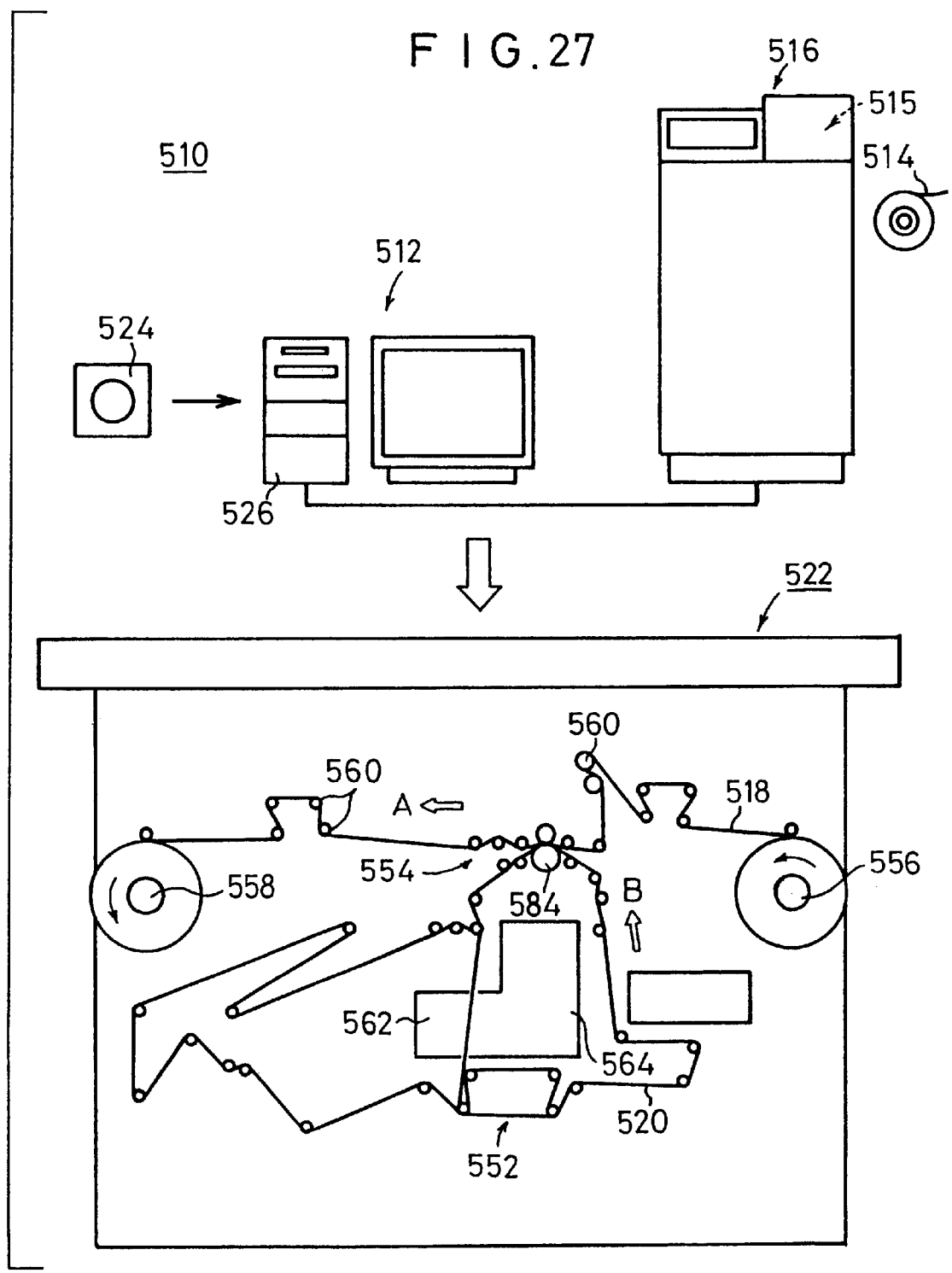
FIG. 27 illustrates a schematic arrangement of a preexposure apparatus according to a third embodiment of the present invention.

FIG. 27 illustrates a schematic arrangement of a preexposure apparatus 510 for carrying out a preexposure method for photosensitive films according to a third embodiment of the present invention. The preexposure apparatus 510 comprises an image control unit 512 for performing control and image data conversion of a manuscript design prepared with digital data, a film transport mechanism 515 for successively arranging respective frames of a reversal film 514 at an exposure position, an image-preparing mechanism 516 for directly exposing the respective frames of the reversal film 514 with the manuscript design to produce an arbitrary positive image, and a print mechanism 522 for developing the reversal film 514 recorded with the manuscript design to obtain a loop-shaped preexposure manuscript 520 having a length in an amount corresponding to a plurality of films, for example, five photosensitive films 518, and then preexposing the photosensitive films 518 with a predetermined image by using the preexposure manuscript 520 and the photosensitive films 518.

The image control unit 512 includes a main body unit 526 for charging a recording medium 524 on which the manuscript design is recorded with digital data. The digital data subjected to the conversion processing is fed from the main body unit 526 to the image-preparing mechanism 516.

Figure 28:
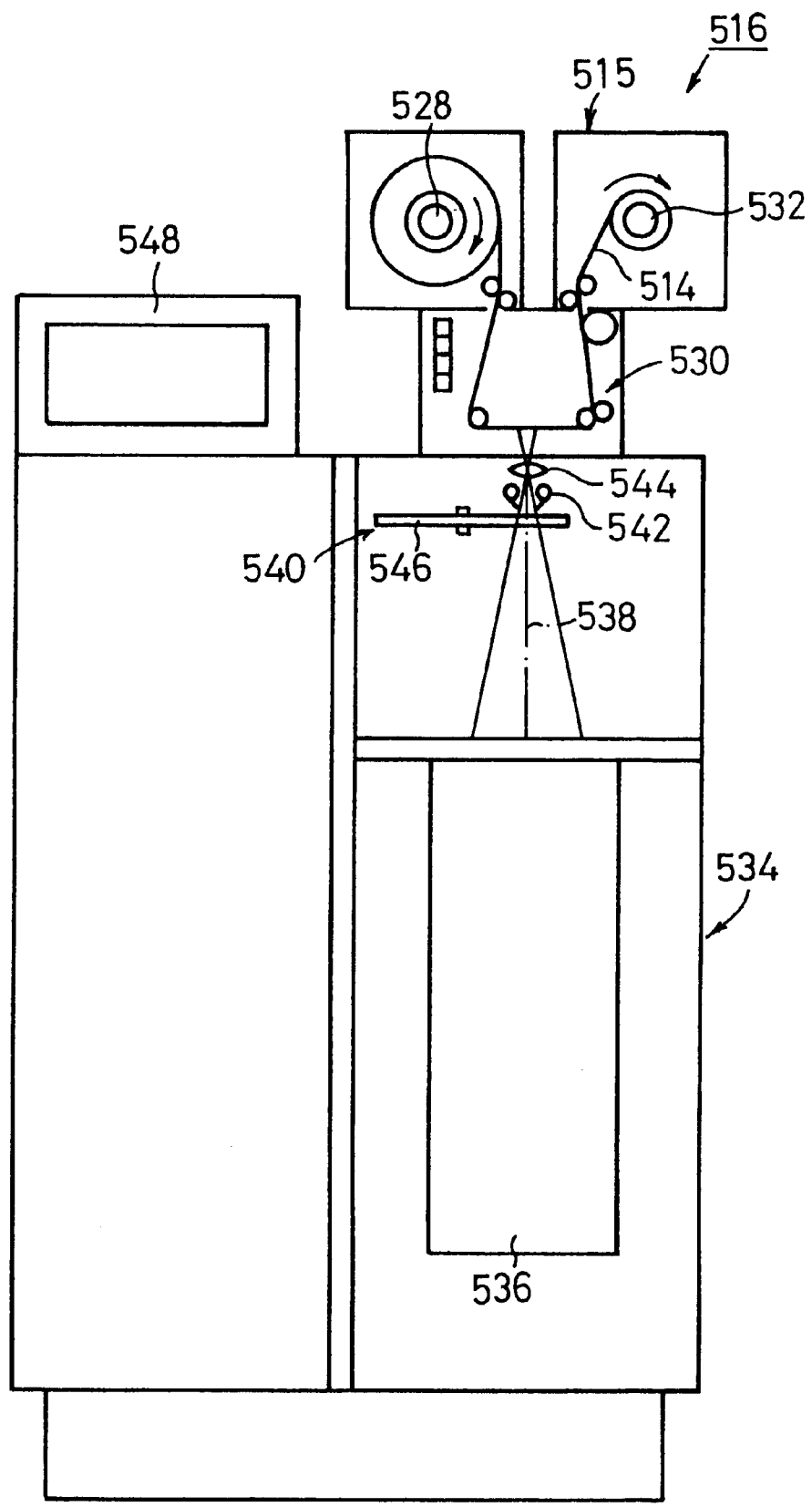
FIG. 28 illustrates an image-preparing mechanism which constitutes the preexposure apparatus.

As shown in FIG. 28, the film transport mechanism 515 includes a feeding shaft 528 for feeding the unexposed reversal film 514, and a winding shaft 532 for winding the reversal film 514 exposed with the predetermined image by an exposure section 530. CRT 536 is arranged in a main body unit 534 which constitutes the image-preparing mechanism 516. A filter 540, a shutter 542, and a lens 544 are arranged on the optical axis 538 of CRT 536. The filter 540 is provided with a rotary plate 546. Respective filter plates of R, G, B, and BL (not shown) are arranged on the rotary plate 546. An arbitrary filter plate can be selectively arranged on the optical axis 538. An operation panel 548 is installed on the main body unit 534.

As shown in FIG. 27, the print mechanism 522 comprises a film transport section 550 for allowing the photosensitive film 518 to travel in the length direction (direction of the arrow A), a manuscript-arranging section 552 for arranging the loop-shaped preexposure manuscript 520 so that the preexposure manuscript 520 may make circumscribing traveling in the direction of the arrow B, and an exposure section 554 for exposing a predetermined portion of the photosensitive film 518 with the image while allowing the preexposure manuscript 520 to make circumscribing movement in a state in which a part of the photosensitive film 518 is overlapped with a part of the preexposure manuscript 520.

The film transport section 550 includes a feeding shaft 556 for rewinding and feeding the wound photosensitive film 518, a winding shaft 558 for winding the photosensitive film 518 after the exposure treatment, and a plurality of guide rollers 560. In the manuscript-arranging section 552, for example, the preexposure manuscript 520 having the length corresponding to five photosensitive films 518 is arranged in a loop-shaped configuration. A lamp house 562 and a filter house 564 are arranged in the manuscript-arranging section 552.

Figure 29:
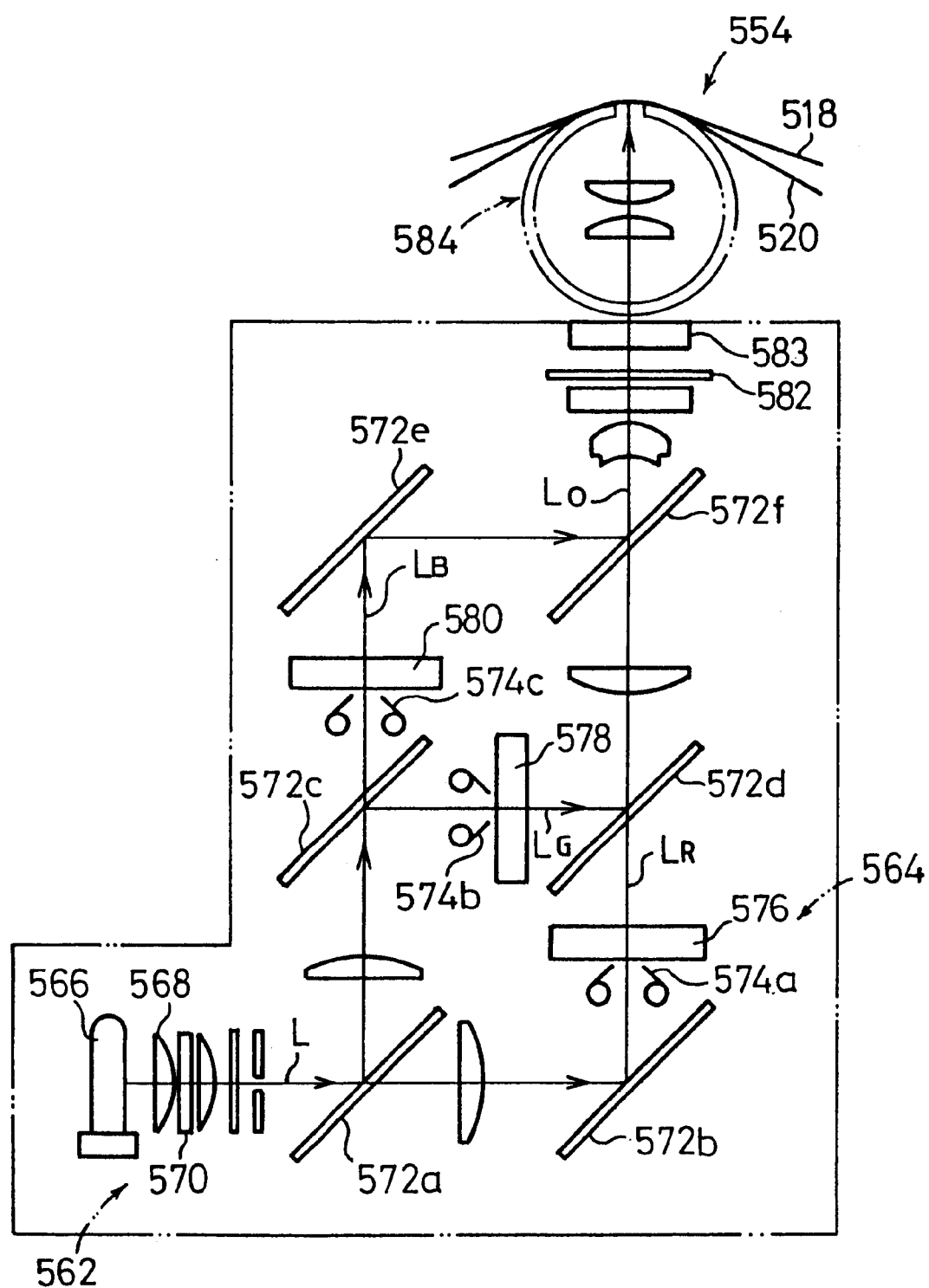
FIG. 29 illustrates an optical system of a printing mechanism which constitutes the preexposure apparatus.

As shown in FIG. 29, an illumination means, for example, a halogen lamp 566 is arranged in the lamp house 562. A light-collecting lens 568 and a heat release glass 570 are arranged on an optical axis of the halogen lamp 566. Six half mirrors 572a to 572f are arranged in the filter house 564. A red filter 576 is arranged on a reflection optical path of the half mirror 572b with a shutter 574a intervening thereon. A green filter 578 is arranged on a reflection optical path of the half mirror 572c with a shutter 574b intervening thereon. On the other hand, a blue filter 580 is arranged on a transmission optical path of the half mirror 572c with a shutter 574c intervening thereon.

Figure 30:
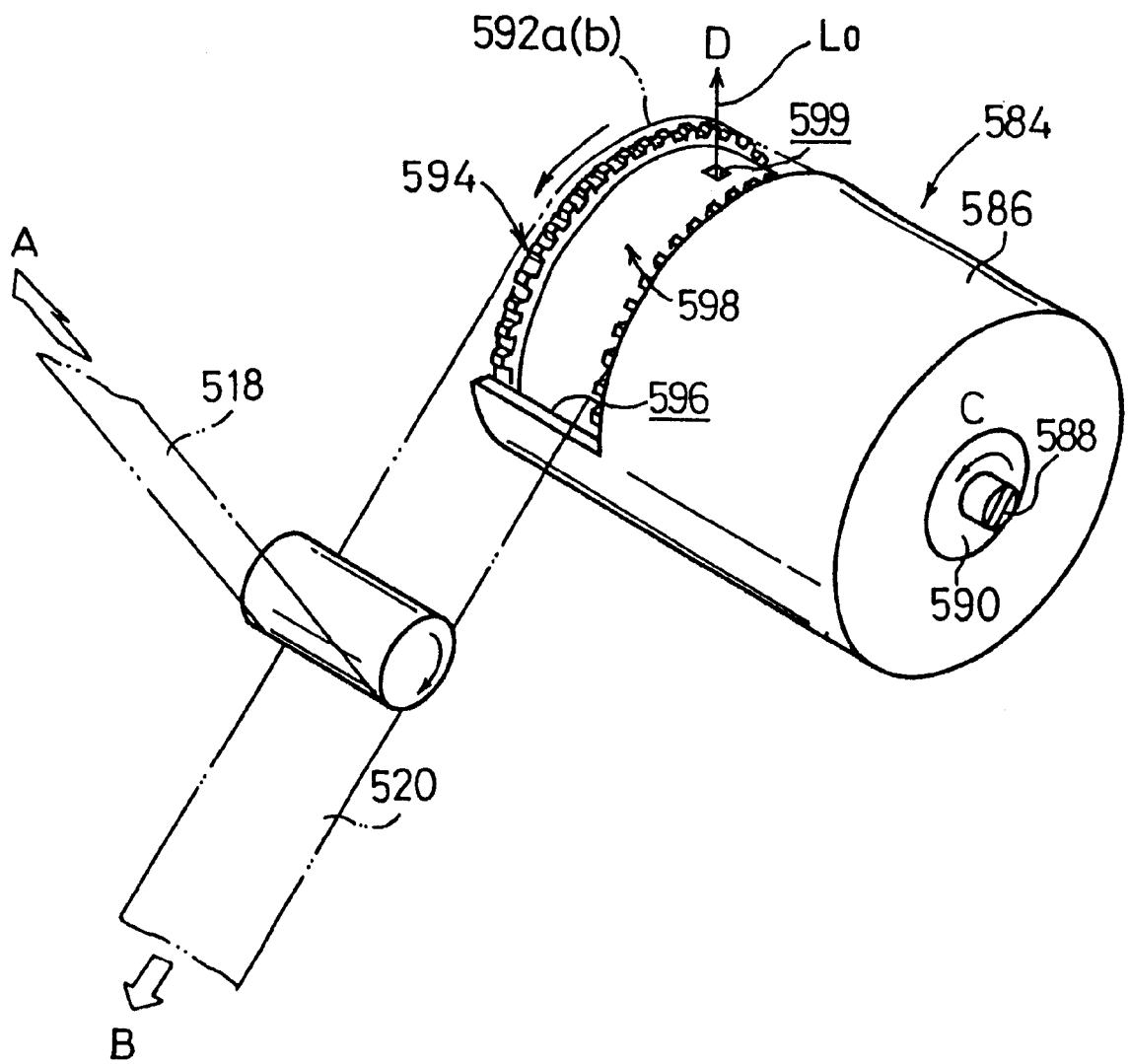
FIG. 30 shows a perspective view illustrating an exposure drum which constitutes the printing mechanism.

An ND filter 582 and a shutter 583 are arranged on an optical path from the half mirror 572f to the exposure section 554. An exposure drum 584, which constitutes the exposure section 554, is arranged in front of the shutter 583. As shown in FIG. 30, the exposure drum 584 is provided with a substantially cylindrical casing 586. A rotary shaft 588, which is connected to an unillustrated rotary driving source to be rotated and driven in the direction of the arrow C, is arranged in the casing 586.

The rotary shaft 588 is secured to the rotary drum 590. The rotary drum 590 is provided with teeth of sprocket (sprocket section) 594 for making tight contact, i.e., for making integral engagement so that respective perforations 592a, 592b, which are formed for the preexposure manuscript 520 and the photosensitive film 518, are not deviated from each other. A part of the outer circumference of the casing 586 is cut out to expose the sprocket 594 to the outside.

An aperture member (fixed aperture member) 598 is provided exchangeably at the cutout 596 of the casing 586. An exposure window 599 for regulating the exposure range of the preexposure manuscript 520 is formed for the aperture member 598.

Figure 31:
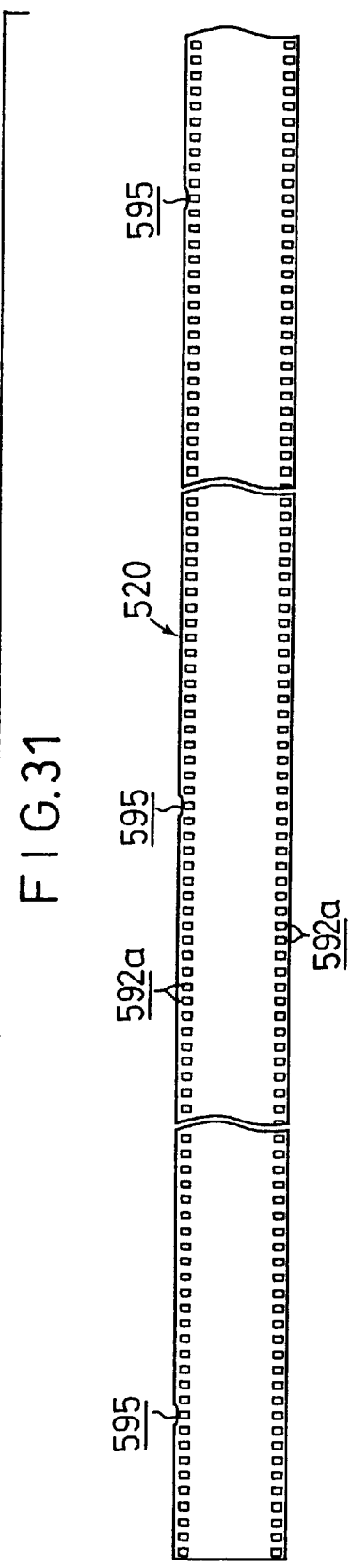
FIG. 31 illustrates a preexposure manuscript to be charged to the printing mechanism.
Figure 32:
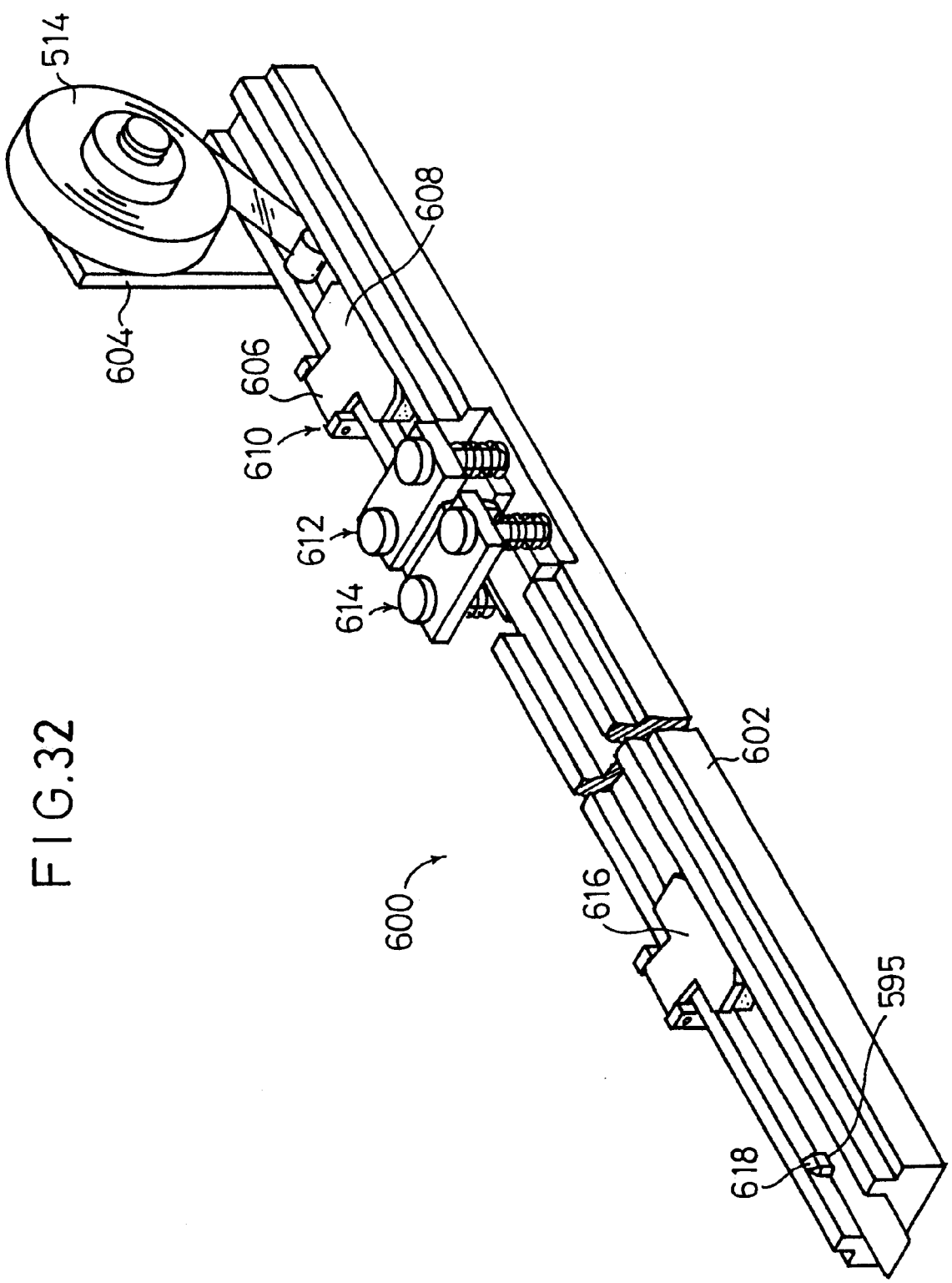
FIG. 32 shows a perspective view illustrating a notch cutter for processing the preexposure manuscript.
Figure 33:
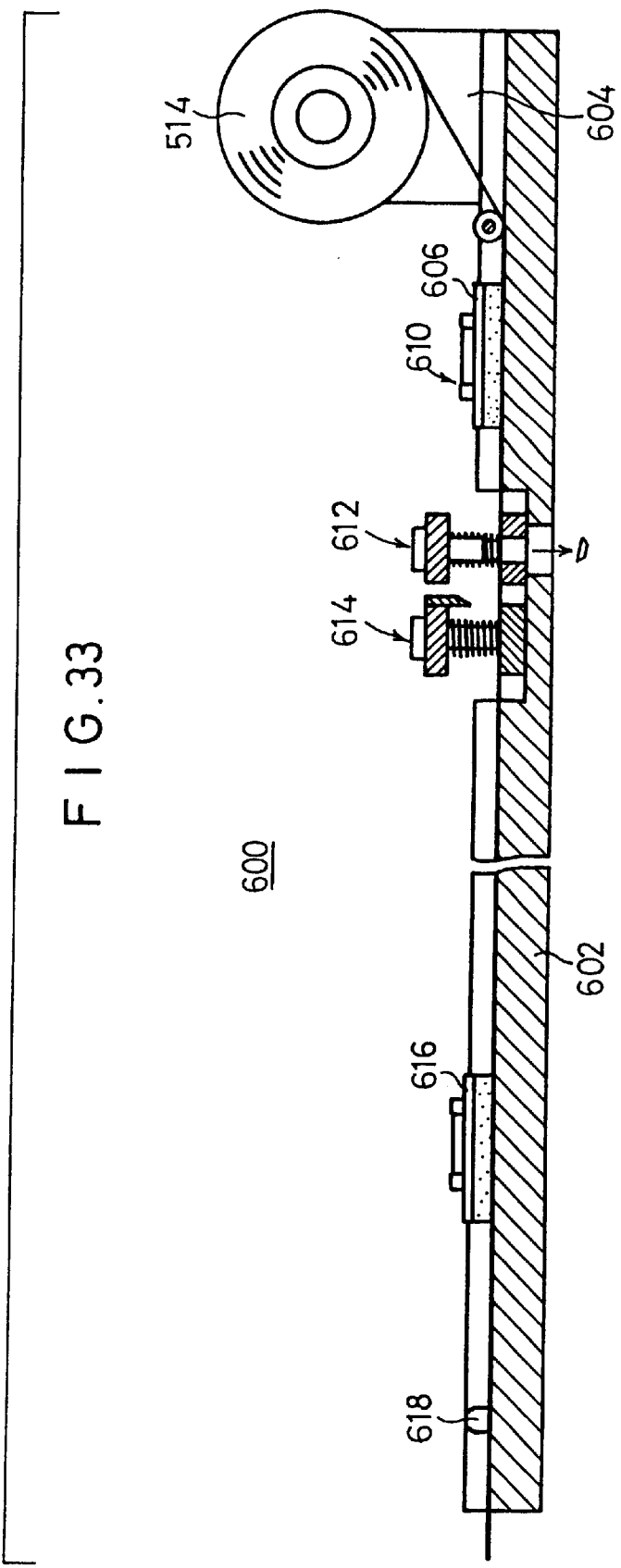
FIG. 33 shows a cross-sectional side view illustrating the notch cutter.

As shown in FIG. 31, the preexposure manuscript 520 is provided at its both ends with the perforations 592a, 592b. A notch 595 is formed at a predetermined position on one side of the preexposure manuscript 520 corresponding to the length of one photosensitive film 518 (for example, an amount of twenty-seven frames). FIGS. 32 and 33 show a notch cutter 600 for forming the notch 595 at one side portion of the preexposure manuscript 520 and cutting the preexposure manuscript 520 corresponding to the length of five photosensitive films 518.

The notch cutter 600 comprises a base pedestal 602. A film-placing stand 604 is provided at one end side of the base pedestal 602 in order to place the roll-shaped reversal film 514. A film presser plate 606 is provided in the vicinity of the film-placing stand 604. A picture adjustment position 608 is set at a substantially central portion of the film presser plate 606. A mark-printing section 610 is arranged at the picture adjustment position 608.

A notching section 612 and an end cutter 614 are arranged while being separated from the picture adjustment position 608 by a predetermined spacing distance. A film presser plate 616 is provided to be separated from the end cutter 614 with a predetermined portion intervening therebetween. A notch adjustment member 618 is fixed at a position separated from the film presser plate 616 by a predetermined spacing distance.

The operation of the preexposure apparatus 510 constructed as described above will be explained below.

Figure 34:
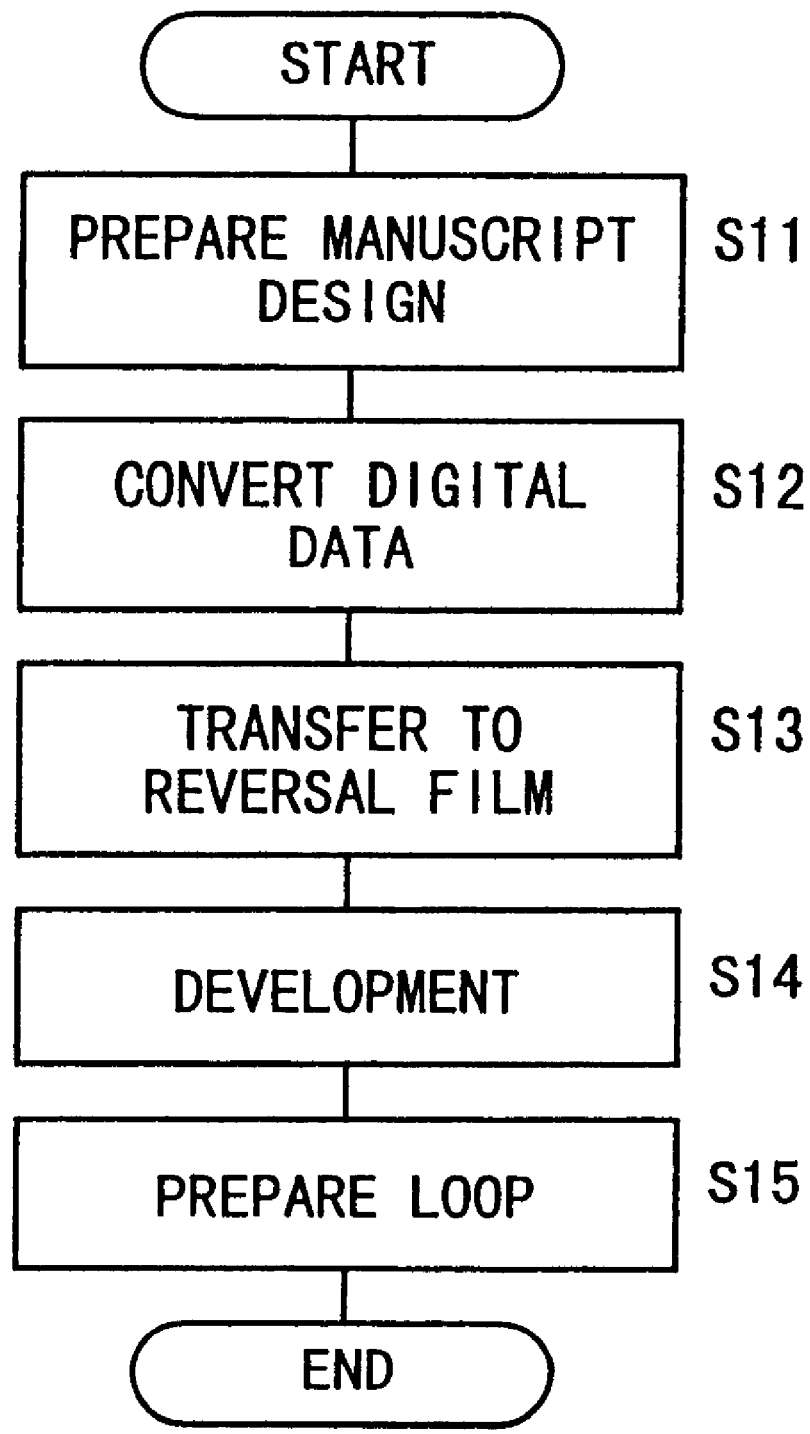
FIG. 34 shows a flow chart for preparation of the preexposure manuscript.

At first, the procedure for preparing the preexposure manuscript 520 will be explained with reference to a flow chart shown in FIG. 34. A desired manuscript design is prepared (step S11), and the manuscript design is recorded as digital data on the recording medium 524. After that, the recording medium 524 is charged to the main body unit 526 which constitutes the image control unit 512. During this process, it is possible to set images having different designs for respective frames (for example, twenty-seven frames) of fifty-one films. A variety of characters are adopted, if necessary.

The digital data of the manuscript design, which is recorded on the recording medium 524, is converted into image data in the image control unit 512 to extract respective pieces of color information of R, G, and B (step S12). The respective pieces of color information are sent to the image-preparing mechanism 516.

In the image-preparing mechanism 516, as shown in FIG. 28, the unexposed reversal film 514 is wound around the feeding shaft 528. The reversal film 514 is fed from the feeding shaft 528, and it is wound around the winding shaft 532. A printing treatment is applied to the reversal film 514 in the exposure section 530 (step S13).

Specifically, CRT 536, which is provided in the main body unit 534, is positioned, while the filter 540 is rotated beforehand so that the R filter plate is arranged on the optical axis 538. CRT 536 is operated to output the R information. The R information is recorded on the surface of the reversal film 514 arranged in the exposure section 530.

Subsequently, when the filter 540 is switched to use the G filter plate, and the G information is outputted from CRT 536, then the G information is recorded on the predetermined surface of the reversal film 514. When the filter 540 is switched to use the B filter plate, and the B information is outputted from CRT 536, then the B information is recorded on the reversal film 514 (step S13).

Subsequently, the filter 540 is switched to use the R filter plate, while the reversal film 514 is wound around the winding shaft 532 by a predetermined distance, for example, in an amount corresponding to eight perforations. After that, the respective pieces of color image information of R, G, and B are recorded on the reversal film 514. After the printing treatment is completed for the reversal film 514 having a predetermined length, for example, 100 feet, the reversal film 514 is removed from the image-preparing mechanism 516, and the development treatment is applied thereto (step S14).

As shown in FIGS. 32 and 33, the reversal film 514 is arranged on the film-placing stand 604 which constitutes the notch cutter 600. The forward end is rewound, and the notch 595 is formed at the predetermined position by the aid of the notching section 612. The forward end of the reversal film 514 is cut by the aid of the end cutter 614. After that, the reversal film 514 is drawn along the base pedestal 602. The position adjustment is performed for the notch 595 by using the notch adjustment member 618. In this state, the notches 595 are formed at the predetermined positions corresponding to two films by the aid of the notching section 612.

The notches 595 are formed at the predetermined positions of the reversal film 514 corresponding to five films by repeatedly performing the operation as described above. After that, the reversal film 514 is cut by the aid of the end cutter 614. Both ends of the reversal film 514 corresponding to five films are Joined to one another to prepare the loop-shaped preexposure manuscript (step S15). Accordingly, the preexposure manuscript 520, which corresponds to five individuals of the film for photographing twenty-seven frames, is prepared in an amount corresponding to twenty-five loops, from the reversal film 514 of 100 feet.

Figure 35:
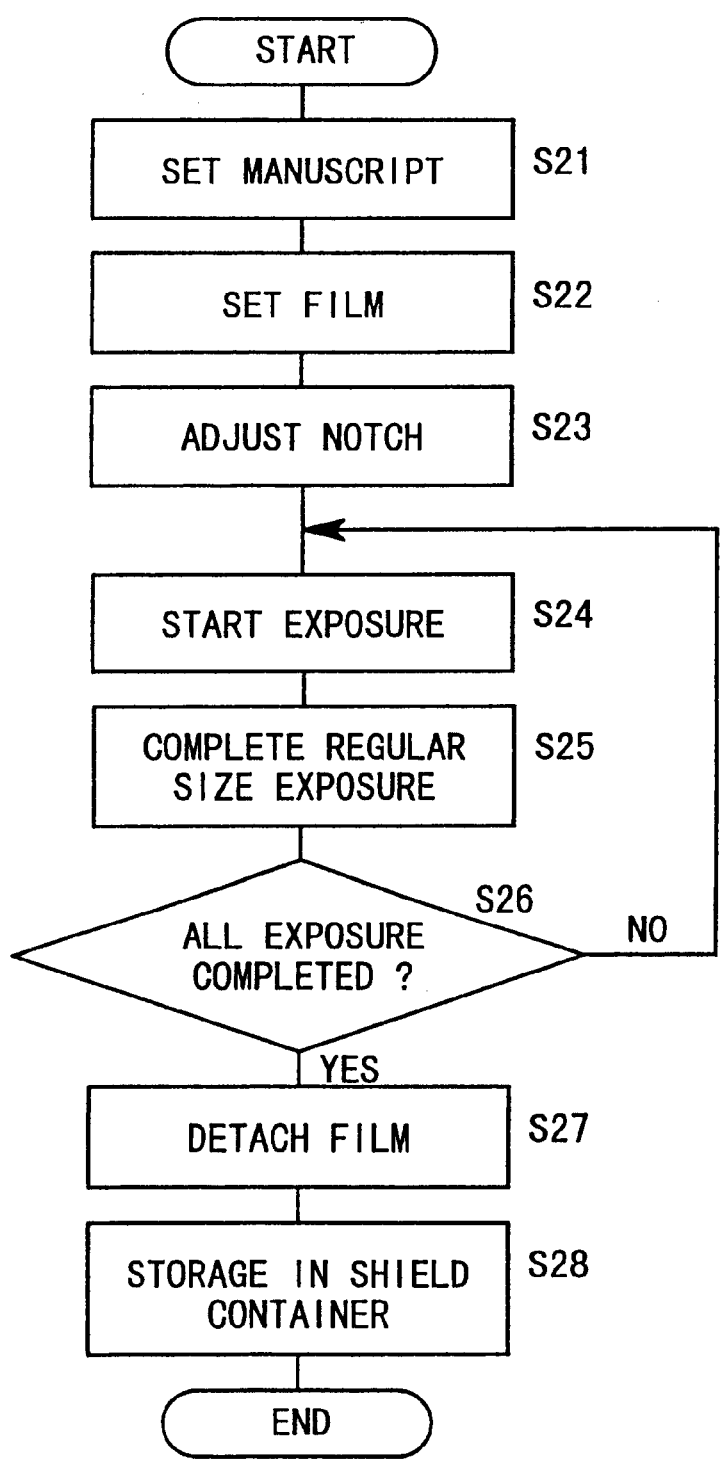
FIG. 35 shows a flow chart for preexposure to photosensitive film by using preexposure manuscript.

Explanation will now be made with reference to a flow chart shown in FIG. 35 for the operation to perform the preexposure treatment for the photosensitive film 518 by using the preexposure manuscript 520.

As shown in FIG. 27, the preexposure manuscript 520 is arranged at the manuscript-arranging section 552. The preexposure manuscript 520 is stretched over the exposure drum 584 (step S21). An unillustrated leader film is stretched over the exposure drum 584. The notch 595 of the preexposure manuscript 520 and the notch (not shown) of the leader film are subjected to position adjustment. After that, the forward end of the leader film is wound around the winding shaft 558. In a state in which the winding tension is applied to the leader film, the unexposed photosensitive film 518 in a wound form is installed to the feeding shaft 556 (step S22).

The notch at the forward end of the photosensitive film 518 and the notch of the leader film are overlapped with each other on a joining stand (not shown). After being cut at the center of the respective notches, the photosensitive film 518 and the leader film are stuck to one another by the aid of an adhesive tape. Accordingly, the notch of the photosensitive film 518 is coincident with the notch 595 of the preexposure manuscript 520 (step S23). In this state, the exposure section 554 is operated. After the preexposure manuscript 520 and the photosensitive film 518 are partially overlapped with each other, the exposure treatment is started (step S24).

In the exposure section 554, as shown in FIG. 29, the shutter 583 is opened, and the halogen lamp 566, which is arranged in the lamp house 562, is turned on. The light beam L, which is radiated from the halogen lamp 566, passes through the half mirrors 572a, 572b, 572c in the filter house 564, and it is introduced into the red filter 576, the green filter 578, and the blue filter 580. The light beam is adjusted by adjusting the opening degree of the shutters 574a to 574c. After the light adjustment, the light beams $L_R$, $L_G$, $L_B$ of R, G, and B are collected, followed by being transmitted through the ND filter 582 to be introduced into the exposure drum 584. The collected light beam Lo of the light beams $L_R$, $L_G$, $L_B$ is transmitted through the exposure window 599 which is provided for the aperture member 598. The collected light beam Lo is radiated onto the preexposure manuscript 520 (see the direction of the arrow D in FIG. 30). The photosensitive film 518 is exposed with the image which is recorded on the preexposure manuscript 520.

During this process, the photosensitive film 518 is allowed to run at a constant speed in the direction of the arrow A. On the other hand, the preexposure manuscript 520 is allowed to run in a circumscribing manner in the direction of the arrow B. During a period in which the preexposure manuscript 520 makes one turn, the desired image is recorded as a latent image on the photosensitive film 518 corresponding to five individuals. The regular size exposure is completed with the preexposure manuscript 520 (step S25).

Subsequently, when the exposure is completed for all of the photosensitive film 518 installed to the feeding shaft 556 (YES in the step S26), the routine proceeds to the step S27 to take out the photosensitive film 518 after completion of the preexposure from the winding shaft 558. The photosensitive film 518 is stored in an unillustrated shield container (step S28).

In the third embodiment, when the preexposure manuscript 520 is prepared, the manuscript design is firstly prepared with the digital data. The digital data is sent from the image control unit 512 to the image-preparing mechanism 516. The manuscript design is directly recorded on the reversal film 514 with the digital data. Therefore, it is possible to efficiently form the image having a high purity, and it is easy to automate the entire preexposure operation. Further, it is possible to easily form different character designs for respective frames of fifty-one films, which is excellent in versatility.

In the third embodiment, the preexposure manuscript 520 is set to have the length corresponding to a plurality of, for example, five individuals of the photosensitive film 518 for photographing twenty-seven frames. The both ends are joined to one another to construct the loop-shaped configuration. Therefore, the following advantage is obtained in the third embodiment as compared with a case in which a preexposure manuscript having a length corresponding to fifty-one films is used. That is, the possibility of adhesion of dust or the like to the preexposure manuscript 520 is decreased, the occurrence of damage or the like is reduced, and it is easy to improve the durability.

In this process, the notches 595 are formed at the side portion of the preexposure manuscript 520. The notches 595 and the notches provided for the photosensitive film 518 are subjected to the position adjustment, and then the exposure treatment is started. Accordingly, the preexposure treatment is performed continuously at a high speed in accordance with the rotary action of the rotary drum 590 in the state in which the preexposure manuscript 520 and the photosensitive film 518 are relatively positioned highly accurately. Thus, an advantage is obtained that the operation efficiency is improved considerably.

Further, the rotary drum 590 is provided with the sprocket 594 to be integrally engaged by the respective perforations 592a, 592b which are formed on the preexposure manuscript 520 and the photosensitive film 518. Therefore, in the exposure section 554, the collected light beam Lo is radiated onto the portion at which the preexposure manuscript 520 and the photosensitive film 518 make tight contact with each other. The photosensitive film 518 is highly accurately exposed with the image which is recorded on the preexposure manuscript 520. Therefore, an effect is obtained that the photosensitive film 518 is exposed with the desired image efficiently in a high quality.

Further, various photosensitive films 518 including, for example, those for photographing twelve frames and thirty-six frames can be used for the preexposure apparatus of the present embodiment, only by changing the position of the notch 595 provided at the side portion of the preexposure manuscript 520. Further, when preexposure manuscript 520 is printed in the reversal manner by using the negative film, it is possible to make the use for recording of animation such as movie films.

In the exposure drum 584, the aperture member 598 is constructed detachably with respect to the casing 586. It is easy to perform the operation for attaching various aperture members 598 having exposure sections 554 with various shapes and different sizes. Accordingly, for example, when the preexposure is performed for a part of the photosensitive film 518, or when the exposure is performed for the entire screen, It Is possible to respond to such cases with simple operation.

FIG. 36 illustrates a schematic arrangement of an image-preparing mechanism 620 for constructing a preexposure apparatus for photosensitive films according to a fourth embodiment of the present invention. The same constitutive components as those of the image-preparing mechanism 16 for constructing the preexposure apparatus 10 according to the first embodiment are designated by the same reference numerals, detailed explanation of which will be omitted.

The image-preparing mechanism 620 is provided with a writing laser 624 which is driven and controlled by a laser-driving circuit 622. The image-preparing mechanism 620 makes it possible to directly expose respective frames of the reversal film 514 with the manuscript design to form an arbitrary positive image by using a laser beam. During this process, it is unnecessary to use the filter 540. Respective pieces of color information of R, G, and B are recorded on the reversal film 514 by controlling the oscillation of the laser 624.

INDUSTRIAL APPLICABILITY

In the preexposure method and the apparatus for the photosensitive film according to the present invention, the photosensitive film is automatically drawn from the shield container held by the holding means, and then the predetermined portion of the photosensitive film is exposed with the image by the aid of the exposure section. The photosensitive film after the exposure is automatically rewound into the shield container. Therefore, it is easy to automate the entire preexposure operation for the photosensitive film, and it is possible to improve the production efficiency. Further, the preexposure process can be continuously performed in accordance with the divided operations. Thus, the preexposure operation can be performed at a high speed, and it is possible to perform the mass production.

In the present invention, the image data and the positioning reference are directly recorded on the sheet manuscript corresponding to a plurality of frames. After that, the sheet manuscript is cut into the manuscript segments having a desired number of frames to be aligned in the manuscript holder. Thus, the preexposure manuscript is prepared integrally. Accordingly, the operation for preparing the preexposure manuscript is efficiently performed. Further, the preexposure image having a high image quality can be formed highly accurately by directly recording the image data on the sheet manuscript.

Further, in the present invention, the preexposure manuscript, which corresponds to the length of a plurality of photosensitive films, is constructed to have the loop-shaped configuration. The photosensitive film can be preexposed with a desired image continuously and highly accurately by the aid of the preexposure manuscript. Accordingly, it is possible to preexpose, at a high speed, a desired portion of the photosensitive film, for example, with photographs, characters, and letters.

What is claimed is:

1. A preexposure method for photosensitive films, comprising the steps of:

holding, with a holding means (20), (410), a shield container (14), (404) containing a photosensitive film (12), (402) wound and accommodated therein;

automatically drawing said photosensitive film (12), (402) from said shield container (14), (404) held by said holding means (20), (410);

relatively positioning said drawn photosensitive film (12), (402) and an exposure section (32), (436);

exposing a predetermined portion of said photosensitive film (12), (402) with an image by the aid of a preexposure manuscript (228) arranged in said exposure section (32), (436); and automatically rewinding said photosensitive film (12), (402) after said exposure into said shield container (14), (404).

2. The preexposure method for photosensitive films according to claim 1, wherein said preexposure manuscript (228) and said photosensitive film (12), (402) are relatively positioned on the basis of an aperture (232).

3. The preexposure method for photosensitive films according to claim 1, wherein an entire length of said photosensitive film (12) is simultaneously exposed with said image in a state in which a surface, that is disposed on a side opposite to an exposure surface of said photosensitive film (12), is attracted and held over said entire length.

4. The preexposure method for photosensitive films according to claim 1, wherein an entire length of said photosensitive film (12) is drawn from said shield container (14) held by said holding means (20).

5. The preexposure method for photosensitive films according to claim 1, further comprising the steps of:
   automatically drawing a predetermined length of said photosensitive film (402) from said shield container (404);
   exposing said predetermined length of said photosensitive film (402) with said image in a state in which a surface of said photosensitive film (402) on a side opposite to an exposure surface is attracted and held; and
   performing said respective steps for an entire length of said photosensitive film.

6. A preexposure method for photosensitive films, for preparing a preexposure manuscript (228) on which an image for preexposing a photosensitive film (12), (402) is recorded, and relatively positioning said preexposure manuscript (228) and said photosensitive film (12), (402) to expose a predetermined portion of said photosensitive film (12), (402) with said image, said preexposure method comprising the steps of:
   preparing a manuscript design with digital data;
   directly exposing a predetermined portion of a sheet manuscript (300) with an arbitrary positive image by using a laser (322) on the basis of said digital data; and
   preparing said preexposure manuscript (228) by using at least one of said sheet manuscript (300).

7. A preexposure method for photosensitive films, for preparing a preexposure manuscript (228) on which an image for preexposing a photosensitive film (12), (402) is recorded, and relatively positioning said preexposure manuscript (228) and said photosensitive film (12), (402) to expose a predetermined portion of said photosensitive film (12), (402) with said image, said preexposure method comprising the steps of:
   preparing a manuscript design with image data;
   directly exposing a predetermined portion of a sheet manuscript (300) with an arbitrary positive image from CRT (536) by the aid of an optical system for image formation (544) on the basis of said image data; and
   preparing said preexposure manuscript (228) by using at least one of said sheet manuscript (300).

8. A preexposure method for photosensitive films, for preparing a preexposure manuscript (228) on which an image for preexposing a photosensitive film (12), (402) is recorded, and relatively positioning said preexposure manuscript (228) and said photosensitive film (12), (402) to expose a predetermined portion of said photosensitive film (12), (402) with said image, said preexposure method comprising the steps of:
   preparing image data for forming said image on a plurality of frames;
   directly recording said image data and a positioning reference (306) on a sheet manuscript (300);
   arranging said sheet manuscript (300) in a processing mechanism (330) on the basis of said positioning reference (306) to perform cutting into manuscript segments (308a, 308b) having a desired number of frames; and
   preparing said preexposure manuscript (228) by using at least one of said manuscript segments (308a, 308b).

9. A preexposure method for photosensitive films, for preparing a preexposure manuscript (228) on which an image for preexposing a photosensitive film (12), (402) is recorded, and relatively positioning said preexposure manuscript (228) and said photosensitive film (12), (402) to expose a predetermined portion of said photosensitive film (12), (402) with said image, said preexposure method comprising the steps of:
   preparing image data for forming said image on a plurality of frames;
   directly recording said image data and a positioning reference (306) on a sheet manuscript (300);
   arranging said sheet manuscript (300) in a processing mechanism (330) on the basis of said positioning reference (306) to perform cutting Into manuscript segments (308a, 308b) having a desired number of frames, and forming a positioning site (310a, 310b) on said manuscript segment (308a, 308b); and
   preparing said preexposure manuscript (228) by arranging a plurality of said manuscript segments (308a, 308b) in a manuscript holder (226) on the basis of said positioning sites (310a, 310b).

10. The preexposure method for photosensitive films according to claim 9, wherein a total number of frames of said plurality of manuscript segments (308a, 308b) is set to be smaller than a number of all frames of said photosensitive film (12), (402).

11. The preexposure method for photosensitive films according to claim 8, wherein a total number of frames of said plurality of manuscript segments (308a, 308b) is set to be the same as a number of all frames of said photosensitive film (12), (402).

12. The preexposure method for photosensitive films according to claim 6, wherein said image has a design which is different between said respective frames.

13. A preexposure method for photosensitive films, comprising the steps of:
   preparing a preexposure manuscript (520) which is composed of a reversal film (514) to record an image thereon and which has a length corresponding to a plurality of photosensitive films (518);
   forming said preexposure manuscript (520) to have a loop-shaped configuration and arranging said preexposure manuscript in an exposure section (554); and
   exposing a predetermined portion of said photosensitive film (518) with said image by the aid of said exposure section (554) while moving said preexposure manuscript (520) in a circumscribing manner in a state in which a part of said photosensitive film (518) is overlapped with a part of said preexposure manuscript (520) in said exposure section (554).

14. The preexposure method for photosensitive films according to claim 13, wherein respective perforations (592a, 592b), which are formed in said preexposure manuscript (520) and said photosensitive film (518) are integrally engaged with a sprocket section (594) of an exposure drum (584) provided for said exposure section (554) to cause circumscribing running in accordance with an action of rotation of said exposure drum (584) in a state in which parts of said preexposure manuscript (520) and said photosensitive film (518) make tight contact with each other.

15. The preexposure method for photosensitive films according to claim 14, wherein said exposure drum (584) is used to perform exposure for a portion at which said preexposure manuscript (520) and said photosensitive film (518) make tight contact with each other, through an aperture (599) formed corresponding to a preexposure area of said photosensitive film (518).

16. The preexposure method for photosensitive films according to claim 13, further comprising the steps of:

preparing a manuscript design with digital data; and successively arranging respective frames of said reversal film (514) at an exposure position, and directly exposing said respective frames of said reversal film (514) with an arbitrary positive image by using a laser (624) on the basis of said digital data.

17. The preexposure method for photosensitive films according to claim 13, further comprising the steps of:

preparing a manuscript design with image data; and successively arranging respective frames of said reversal film (514) at an exposure position, and directly exposing said respective frames of said reversal film (514) with an arbitrary positive image by using an optical system for image formation (544) from CRT (536) on the basis of said image data.

18. The preexposure method for photosensitive films according to claim 13, further comprising the steps of:

forming a notch (595) at a predetermined position of said reversal film (514);

cutting a forward end of said reversal film (514), and then forming said notch (595) at said predetermined position of said reversal film (514); and cutting said reversal film (514) corresponding to a length of a predetermined number of said photosensitive films (518), and then joining both ends of said reversal film (514) to prepare said preexposure manuscript (520) having said loop-shaped configuration.

19. The preexposure method for photosensitive films according to claim 18, wherein said preexposure manuscript (520) and said photosensitive film (518) are positioned by adjusting said notch (595) provided for said preexposure manuscript (520) and a notch provided for said photosensitive film (518), and then exposure is performed with said image by the aid of said exposure section (554).

* * * * *